United States Patent
Torvinen et al.

(10) Patent No.: US 11,330,433 B2
(45) Date of Patent: May 10, 2022

(54) PRIVACY KEY AND MESSAGE AUTHENTICATION CODE

(71) Applicant: Telefonaktiebolaget LM Ericsson (publ), Stockholm (SE)

(72) Inventors: Vesa Torvinen, Sauvo (FI); Noamen Ben Henda, Stockholm (SE); David Castellanos Zamora, Madrid (ES); Prajwol Kumar Nakarmi, Sollentuna (SE); Pasi Saarinen, Spånga (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 279 days.

(21) Appl. No.: 16/633,908

(22) PCT Filed: Jul. 17, 2018

(86) PCT No.: PCT/EP2018/069433
§ 371 (c)(1),
(2) Date: Jan. 24, 2020

(87) PCT Pub. No.: WO2019/020440
PCT Pub. Date: Jan. 31, 2019

(65) Prior Publication Data
US 2021/0153010 A1     May 20, 2021

Related U.S. Application Data

(60) Provisional application No. 62/536,632, filed on Jul. 25, 2017.

(51) Int. Cl.
*H04L 29/06*     (2006.01)
*H04W 12/06*     (2021.01)
(Continued)

(52) U.S. Cl.
CPC ............. *H04W 12/06* (2013.01); *H04L 9/083* (2013.01); *H04L 9/088* (2013.01); *H04L 9/0841* (2013.01);
(Continued)

(58) Field of Classification Search
CPC ...... H04L 9/3242; H04L 9/3247; H04W 8/18; H04W 12/02; H04W 12/033; H04W 12/04; H04W 12/0433; H04W 12/72
See application file for complete search history.

(56) References Cited

U.S. PATENT DOCUMENTS

| | | |
|---|---|---|
| 9,338,164 B1 | 5/2016 | Liu et al. |
| 2004/0030911 A1 | 2/2004 | Isozaki et al. |

(Continued)

FOREIGN PATENT DOCUMENTS

| | | |
|---|---|---|
| CN | 101563880 A | 10/2009 |
| CN | 102668501 A | 9/2012 |

(Continued)

OTHER PUBLICATIONS

Decision of Grant dated Apr. 28, 2020 issued in Russian Patent Application No. 2020107748/007(012441). (13 pages).

(Continued)

*Primary Examiner* — Sher A Khan
(74) *Attorney, Agent, or Firm* — Rothwell, Figg, Ernst & Manbeck, P.C.

(57) ABSTRACT

A method performed by an authentication server for provisioning a user equipment (1), UE. The method comprises: obtaining a message authentication code, MAC, based on a provisioning key specific to the UE to the UE and a privacy key of a home network (3) of the UE, wherein the provisioning key is a shared secret between the authentication server (14) and the UE and the privacy key comprises a public key of the home network; and transmitting the
(Continued)

privacy key and the MAC to the UE. Methods performed by a de-concealing server and the UE, respectively are also disclosed as well as authentication servers, de-concealing servers and UEs. A computer program and a memory circuitry (13) are also disclosed.

20 Claims, 11 Drawing Sheets

(51) Int. Cl.
  H04W 12/02    (2009.01)
  H04W 12/04    (2021.01)
  H04L 9/08     (2006.01)
  H04L 9/32     (2006.01)
  H04W 12/72    (2021.01)
  H04W 12/0433  (2021.01)
  H04W 12/033   (2021.01)
  H04L 9/30     (2006.01)
  H04W 8/18     (2009.01)
  H04W 60/00    (2009.01)
  H04W 12/10    (2021.01)
  H04W 12/75    (2021.01)

(52) U.S. Cl.
  CPC ............ *H04L 9/3066* (2013.01); *H04L 9/321* (2013.01); *H04L 9/3242* (2013.01); *H04L 9/3247* (2013.01); *H04L 63/0414* (2013.01); *H04L 63/0428* (2013.01); *H04L 63/06* (2013.01); *H04W 8/18* (2013.01); *H04W 12/02* (2013.01); *H04W 12/033* (2021.01); *H04W 12/04* (2013.01); *H04W 12/0433* (2021.01); *H04W 12/72* (2021.01); *H04W 60/00* (2013.01); *H04L 63/123* (2013.01); *H04L 2209/80* (2013.01); *H04L 2463/061* (2013.01); *H04W 12/10* (2013.01); *H04W 12/75* (2021.01)

(56) References Cited

U.S. PATENT DOCUMENTS

| | | | |
|---|---|---|---|
| 2009/0239503 A1* | 9/2009 | Smeets | H04W 12/04 455/411 |
| 2009/0253409 A1 | 10/2009 | Slavov et al. | |
| 2012/0278869 A1 | 11/2012 | Guccione et al. | |
| 2012/0295618 A1* | 11/2012 | Ahmavaara | H04W 8/04 455/435.1 |
| 2013/0003971 A1* | 1/2013 | Forsberg | H04L 63/0428 380/255 |
| 2013/0067552 A1 | 3/2013 | Hawkes et al. | |
| 2013/0305330 A1* | 11/2013 | Palanigounder | H04L 63/0876 726/6 |
| 2014/0019751 A1 | 1/2014 | Hsu et al. | |
| 2015/0143125 A1 | 5/2015 | Nix | |
| 2016/0094988 A1 | 3/2016 | Lee et al. | |
| 2017/0012974 A1* | 1/2017 | Sierra | H04L 63/0892 |
| 2017/0346807 A1* | 11/2017 | Blasi | G06F 21/105 |
| 2018/0167367 A1* | 6/2018 | John | H04L 9/0825 |
| 2018/0183596 A1* | 6/2018 | Deshpande | H04W 4/00 |
| 2018/0184177 A1* | 6/2018 | Beals | H04N 21/2351 |
| 2018/0189193 A1* | 7/2018 | Bernat | H04L 9/0894 |
| 2020/0068391 A1 | 2/2020 | Liu et al. | |

FOREIGN PATENT DOCUMENTS

| | | |
|---|---|---|
| CN | 103329585 A | 9/2013 |
| CN | 103370915 A | 10/2013 |
| CN | 104303484 A | 1/2015 |
| RU | 2424624 C2 | 7/2011 |
| WO | 2014/033698 A2 | 3/2014 |
| WO | 2016/048574 | 3/2016 |
| WO | 2016/209126 A1 | 12/2016 |

OTHER PUBLICATIONS

International Search Report and Written Opinion dated Nov. 7, 2018 issued in International Application No. PCT/EP2018/069433. (14 pages).
Ericsson, "Clause 6.12.5 (NF discovery with SUCI)", 3GPP TSG SA WG3 (Security) Meeting #90bis; S-180824; (Feb. 26-Mar. 2, 2018); San Diego. (2 pages).
Nokia, "UDM and SIDF discovery", 3GPP TSG SA WG3 (Security) Meeting #90Bis; S3-180767; (Feb. 26-Mar. 2, 2018); San Diego. (2 pages).
3GPP TS 33.501 V0.2.0 (May 2017); 3rd Generation Partnership Project; Technical Specification Group Services and System Aspects; Security Architecture and Procedures for 5G System (Release 15). (25 pages).
3GPP TR 33.899 V1.2.0 (Jun. 2017); 3rd Generation Partnership Project; Technical Specification Group Services and System Aspects; Study on the security aspects of the next generation system (Release 14). (586 pages).
Ahola, K. et al., "5G Enablers for Network and System Security and Resilience", 5G-ENSURE, Deliverable D3.6; 5G-PPP security enablers open specifications (v2.0), (Jan. 5, 2017). (294 pages).
3GPP TS 23.003 V15.0.0 (Jun. 2017); 3rd Generation Partnership Project; Technical Specification Group Core Network and Terminals; Numbering, addressing and identification (Release 15). (108 pages).
3GPP TS 23.501 V1.0.0 (Jun. 2017); 3rd Generation Partnership Project; Technical Specification Group Services and System Aspects; System Architecture for the 5G System; Stage 2 (Release 15). (146 pages).
3GPP TS 33.220 V15.0.0 (Jun. 2017); 3rd Generation Partnership Project; Technical Specification Group Services and System Aspects; Generic Authentication Architecture (GAA); Generic Bootstrapping Architecture (GBA) (Release 15). (93 pages).
Aboba, B. et al., "The Network Access Identifier", Network Working Group; Request for Comments: 4282 (Dec. 2005). (16 pages).
Simon, D. et al., "The EAP-TLS Authentication Protocol", Network Working Group; Request for Comments: 5216 (Mar. 2008). (34 pages).
Ericsson, "Storage, processing and provisioning of the home network public key", 3GPP TSG SA WG3 (Security) Meeting #88; S3-171776; (Aug. 7-11, 2017); Dali, China. (3 pages).
Gemalto, "Comments to S3-171776 on Storage, processing and provisioning of the home network public key", 3GPP TSG SA WG3 (Security) Meeting #88; S3-172071; (Aug. 7-11, 2017); Dail, China. (3 pages).
Ericsson, "Subscription Permanent Identifiers in the 5G System", SA WG2 Meeting #120, S2-171673, Busan, Korea, Mar. 27-31, 2017 (4 pages).
Ericsson et al., "Subscription Permanent Identifiers in the 5G System", SA WG2 Meeting #120, S2-172660, Busan, Korea, Mar. 27-31, 2017 (4 pages).
Qualcomm Incorporated, "23.501: UE temporary identifier in 5GS", SA WG2 Meeting #S2-119, S2-170744, Dubrovnik, Croatia, Feb. 13-17, 2017 (6 pages).

* cited by examiner

PRIVACY KEY AND MESSAGE AUTHENTICATION CODE

CROSS REFERENCE TO RELATED APPLICATION(S)

This application is a 35 U.S.C. § 371 National Stage of International Patent Application No. PCT/EP2018/069433, filed 17 Jul. 2018, designating the United States and claiming priority to U.S. provisional application No. 62/536,632, filed on 25 Jul. 2017. The above identified applications are incorporated by reference.

TECHNICAL FIELD

The present disclosure relates to methods for provisioning a user equipment (UE), a method for obtaining a private key, authentication servers, de-concealing servers, UEs, a memory circuitry and a computer program for a server device.

BACKGROUND

It is important to maintain the confidentiality of a user equipment's (UE's) long-term subscription identifier (e.g., an IMSI (International Mobile Subscriber Identity)). Early generation 3GPP systems (e.g., 4G/LTE, 3G/UMTS, 2G/GSM) included a partial mechanism for long-term subscription identifier confidentiality using one or more short-term subscription identifiers. GUTI (Globally Unique Temporary ID) and C-RNTI (Cell-Radio Network Temporary Identifier) are examples of short-term subscription identifiers in 4G/LTE systems. However, the legacy partial mechanism may expose the long-term subscription identifier in clear text over the air interface. For example, so-called "IMSI catchers" could simply ask the long-term identifier from the UE, e.g., using identifier request/response messages.

The $3^{rd}$ Generation Partnership Project (3GPP) currently discusses how security, such as privacy, can be improved in communications networks. With respect to 5G, the 3GPP TS 33.501 V0.2.0 mentions a Subscription Permanent Identifier (SUPI) and it is there noted that the SUPI may be concealed, e.g. in the form of a pseudonym or a public-key encrypted SUPI.

SUMMARY

An object of the invention is to facilitate security in communication between a UE and a communications network.

A first aspect of the invention relates to a method performed by an authentication server for provisioning a UE. The method comprises:

obtaining a message authentication code, MAC, based on a provisioning key specific to the UE and a privacy key of a home network of the UE, wherein the provisioning key is a shared secret between the authentication server and the UE, and the privacy key comprises a public key of the home network; and transmitting the privacy key and the MAC to the UE.

The obtaining of the MAC comprises in one embodiment a generation of the MAC. In another embodiment the obtaining of the MAC comprises receiving the MAC from a de-concealing server.

The method may further comprise obtaining the provisioning key responsive to successfully authentication of the UE. In such an embodiment, the obtaining of the provisioning key may comprise generating the provisioning key. Alternatively, obtaining the provisioning key may comprise receiving the provisioning key from a de-concealing server.

The method may further comprise receiving a request to provision the UE, wherein the request comprises the privacy key. In such an embodiment, the receiving of the request to provision the UE may comprise receiving in a message the request to provision the UE and an authentication vector for authenticating the UE. The request to provision the UE may in any of such embodiments further comprise at least one additional privacy key of the home network, and the method may further comprise transmitting the at least one additional privacy key to the UE. Furthermore, in any one of such embodiments, the method may further comprise transmitting a subscription concealed identifier, SUCI, of the UE indicating that the UE lacks a valid privacy key to a de-concealing server, and receiving the request to provision the UE from the de-concealing server in response. In embodiments according to the latter embodiment, the privacy key may be one of a plurality of privacy keys of the home network and may be managed by the de-concealing server.

The request to provision the UE may further comprise a Subscription Permanent Identifier, SUPI, of the UE.

In an embodiment of the method, the transmitting of the privacy key and MAC to the UE may comprise transmitting the privacy key and MAC to the UE together in a registration acceptance messaging procedure.

An embodiment of the method further comprises receiving a subscription concealed identifier, SUCI, of the UE using a null encryption scheme for a subscription identifier comprised in the SUCI. The SUCI may comprise a clear-text part with a public key identifier, an encryption scheme identifier, and encryption scheme parameters for decrypting an encrypted part of the SUCI according to an encryption scheme identified by the encryption scheme identifier.

The privacy key and the MAC may be transmitted to the UE in one or more Non Access Stratum messages related to a registration procedure for the UE.

The transmission of the privacy key and the MAC to the UE may be done via an Access and Mobility Management Function, AMF.

A second aspect of the invention relates to a method performed by a de-concealing server for provisioning a UE. The method comprises:

generating a SUPI and a privacy key for the UE, wherein the privacy key comprises a public key of a home network of the UE, responsive to receiving, from an authentication server, a SUCI of the UE that indicates that the UE lacks a valid privacy key;

generating a MAC based on the privacy key and a provisioning key which is specific to the UE and is a shared secret between the de-concealing server and the UE, transmitting the SUPI, the MAC and the privacy key to the authentication server.

An embodiment of the second aspect may comprise detecting that the SUCI indicates that the UE lacks a valid privacy key by detecting that at least part of the SUCI is encrypted using an obsolete privacy key. In such an embodiment, the obsolete privacy key may be an expired or compromised privacy key.

The generating of the privacy key may comprise generating the privacy key in accordance with an encryption scheme policy governing secure communication of a subscriber identifier of the UE in a wireless communication network. In such an embodiment, the generating of the privacy key in accordance with the encryption scheme policy may comprise generating the privacy key such that the privacy key is adapted for generating a new SUCI in which the subscriber identifier of the UE is encrypted according to an Elliptic Curve Integrated Encryption scheme.

The method according to the second aspect may comprise generating at least one additional privacy key responsive to receiving the SUCI, and transmitting the at least one additional privacy key to the authentication server.

The method according to the second aspect may further comprise transmitting the provisioning key to the authentication server.

The privacy key may comprise an identifier that identifies in which of a plurality of encryption schemes the public key is used. In such an embodiment the privacy key may further comprise a parameter used in the encryption scheme in which the public key is used.

The privacy key may comprise a subscription identifier, e.g. a Mobile Subscription Identification Number (MSIN), of the UE.

The privacy key may comprise an identifier of the home network. The privacy key may comprise validity time information indicating a time in which the privacy key is valid. The privacy key may comprise a digital signature calculated over one or more parts of the privacy key. The privacy key may comprise a field explicitly indicating a procedure in which the privacy key may be used.

A third aspect of the invention relates to a method performed by a user UE for obtaining a privacy key. The method comprises:

receiving the privacy key and a MAC from an authentication server, where the privacy key comprises a public key of a home network of the UE; and
verifying the integrity of the privacy key by
generating a provisioning key, which is specific for the UE and is a shared secret between the UE and the authentication server; and
using the provisioning key and the privacy key to reproduce the MAC received from the authentication server.

The method according to the third aspect may further comprise transmitting a SUCI to the authentication server and receiving the privacy key in response. The SUCI may in that case indicate that the UE lacks a valid privacy key. The transmission of the SUCI may comprise transmitting the SUCI in a request to register with a wireless communication network. In such an embodiment, the method according to the third aspect may further comprise receiving the privacy key and MAC from the authentication server via a mobility management function and in a registration acceptance message. The method may in such a case further comprise in response to verifying the privacy key:
detaching from the wireless communication network;
generating a different SUCI in which a subscription identifier, e.g. an MSIN, of the UE is encrypted by at least part of the privacy key;
re-registering with the wireless communication network using the different SUCI.

The method of the third aspect may further comprise using a tamper resistant secure hardware component of the UE to obtain the SUCI. In such an embodiment, the method may further comprise storing the privacy key in the tamper resistant secure hardware component. The method may further comprise detecting that the UE lacks the valid privacy key responsive to insertion of the tamper resistant secure hardware component into the UE. Using the tamper resistant secure hardware component to obtain the SUCI, may comprise using the tamper resistant secure hardware component to generate the SUCI. Using the tamper resistant secure hardware component to obtain the SUCI may comprise performing a read operation on the tamper resistant secure hardware component to obtain the SUCI. Using the tamper resistant secure hardware component to obtain the SUCI may comprise sending a time to the tamper resistant secure hardware component and receiving the SUCI from the tamper resistant secure hardware component in response.

Using the tamper resistant secure hardware component to obtain the SUCI may comprise using a different privacy key obtained from the tamper resistant hardware component to generate the SUCI. In such an embodiment, in case the different privacy key is expired, the method may further comprise replacing the different privacy key with the privacy key.

The privacy key and the MAC received from the authentication server may in an embodiment of the method of the third aspect be received via an Access and Mobility Management Function (AMF).

A fourth aspect of the invention relates to an authentication server for provisioning a UE. The authentication server comprises a processing circuitry and a memory circuitry. The memory circuitry contains instructions executable by the processor circuitry whereby the authentication server is operative to:
obtain a MAC based on a provisioning key specific to the UE and a privacy key of a home network of the UE, wherein the provisioning key is a shared secret between the authentication server and the UE and the privacy key comprises a public key of the home network;
transmit the privacy key and the MAC to the UE.

A fifth aspect relates to an authentication server for provisioning a UE. The authentication server comprises:
an obtaining module configured to obtain a MAC based on a provisioning key specific to the UE and a privacy key of a home network of the UE, wherein the provisioning key is a shared secret between the authentication server and the UE and the privacy key comprises a public key of the home network;
a transmitting module configured to transmit the privacy key and MAC to the UE.

The authentication server according to the fourth or fifth aspect may be configured to perform the method of the first aspect according to any one of its embodiments.

The authentication server according to the fourth or fifth aspect may comprise an Authentication Server Function.

A sixth aspect relates to a de-concealing server for provisioning a UE. The de-concealing server comprises a processing circuitry and a memory circuitry. The memory circuitry contains instructions executable by the processing circuitry whereby the de-concealing server is operative to:
responsive to receiving, from an authentication server, a SUCI of the UE that indicates that the UE lacks a valid privacy key, generate a SUPI and a privacy key for the UE, wherein the privacy key comprises a public key of a home network of the UE;
generating a MAC based on the privacy key and a provisioning key which is specific to the UE and is a shared secret between the de-concealing server and the UE; and
transmitting the SUPI, the MAC and the privacy key to the authentication server.

A seventh aspect relates to a de-concealing server for provisioning a UE. The de-concealing server is configured to:
responsive to receiving from an authentication server, a SUCI of the UE that indicates that the UE lacks a valid privacy key, generate a SUPI and privacy key for the UE, wherein the privacy key comprises a public key of a home network of the UE;

generate a MAC based on the privacy key and a provisioning key which is specific to the UE and is a shared secret between the de-concealing server and the UE; and transmit the SUPI, the MAC and the privacy key to the authentication server.

The de-concealing server according to the sixth or the seventh aspect may be configured to perform the method of the second aspect according to any one of its embodiments of any one of embodiments.

The de-concealing server according to the sixth or the seventh aspect may comprise at least one Subscription Identifier De-concealing Function and a Unified Data Management.

An eighth aspect relates to a UE for obtaining a privacy key. The UE comprises a processing circuitry and a memory circuitry. The memory circuitry contains instructions executable by the processing circuitry whereby the UE is operative to:

receive the privacy key which comprises a public key of a home network of the UE, and a MAC from an authentication server;

verify the integrity of the privacy key by
generating a provisioning key which is specific for the UE and is a shared secret between the UE and the authentication server; and
using the provisioning key and privacy key to reproduce the MAC received from the authentication server.

A ninth aspect relates to a UE for obtaining a privacy key. The UE is configured to:

receive the privacy key, which comprises a public key of a home network of the UE, and a MAC from an authentication server;

verify the integrity of the privacy key by
generating a provisioning key which is specific for the UE and is a shared secret between the UE and the authentication server; and
using the provisioning key and privacy key to reproduce the MAC received from the authentication server.

A tenth aspect relates to a UE for obtaining a privacy key. The UE comprises:

a receiving module configured to receive the privacy key, which comprises a public key of a home network of the UE, and a MAC from an authentication server;

a verifying module configured to verify the integrity of the privacy key by generating a provisioning key, which is specific for the UE and is a shared secret between the UE and the authentication server; and using the provisioning key and privacy key to reproduce the MAC received from the authentication server.

An eleventh aspect relates to a computer program which comprises instructions which, when executed on at least one processing circuitry of a server device, cause the at least one processor to carry out the method according to any one of the first, second and third aspects.

A twelfth aspect relates to a memory circuitry comprising the computer program.

DETAILED DESCRIPTION

Figure 1:
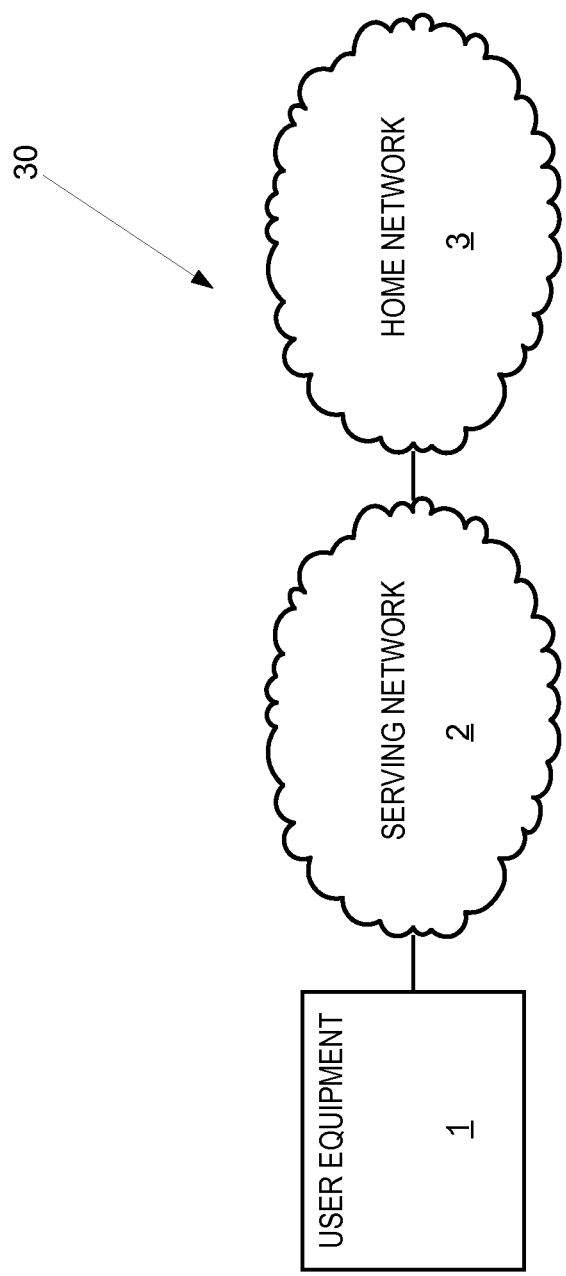
FIG. 1 illustrates an exemplary wireless communication network.

FIG. 1 illustrates an example wireless communication network 30 that includes a UE 1, a serving network 2, and a home network 3. The UE and home network are both communicatively connected to, and exchange signals with each other via, the serving network. The UE is configured with a subscription identifier identifying a subscription supported by the home network, and accesses the home network using the serving network.

Typical examples of the UE include a mobile equipment (ME), mobile terminal, smartphone, personal computer, a laptop computer, a desktop computer, a workstation, a tablet computer, a wearable computer, and/or a smart appliance. According to particular embodiments of the UE 1, the UE may comprise a general memory storage as part of an ME, and a tamper resistant secure hardware component 8 providing secure storage, such as a 5G-USIM (Universal Subscriber Identity Module), a UICC (Universal Integrated Circuit Card), e.g. with a 5G-USIM installed thereon, and/or other secure storage device. According to such embodiments, any of the capabilities attributed to the UE, generally, may be performed using the tamper resistant secure hardware component of the UE.

The serving network 2 includes one or more physical devices and/or signaling mediums capable of exchanging communication signals with the UE 1 and the home network 3. In particular, the serving network may include hardware that provides one or more: access points (e.g., a base station, eNodeB, femtocell, and/or wireless access point), access networks, authentication servers, Access and Mobility management Functions (AMFs), Security Anchor Functions (SEAFs), Authentication Server Functions (AUSFs), and/or any combination thereof (not shown). In particular, an authentication server may provide one or more AMFs, SEAFs AUSFs, and/or any combination thereof. Details of these network entities will be discussed in further detail below.

The home network 3 includes one or more physical devices and/or signaling mediums capable of exchanging communication signals with the UE 1 via the serving network 2. In particular, the home network may include one or more: de-concealing servers, authentication servers (e.g., as described above), key provisioning servers, Subscription Identifier De-concealing Functions (SIDFs), Privacy Key Provisioning Functions (PKPFs), Unified Data Management (UDM) and/or any combination thereof (not shown). In particular, a de-concealing server may provide one or more SIDFs, PKPFs, and/or any combination thereof. Particular of these network entities will also be discussed in further detail below.

Examples of the serving and/or home network include (but are not limited to) one or more: local area networks; wireless networks; cellular networks; Internet Protocol-based networks; Ethernet networks; optical networks; and/or circuit switched networks. Such networks may comprise any number of networking devices such as routers, gateways, switches, hubs, firewalls, and the like (not shown) supporting the exchange of such communication signals.

Although FIG. 1 illustrates separate serving and home networks, in some embodiments of the present disclosure, the home network 3 is the serving network 2, i.e. in the case when the UE is not roaming. Further, although examples of particular functions in either the home network or the serving network were specified above, those particular functions may be in the other of the home network or serving network according to particular embodiments. Further still, although only one UE 1 is illustrated in FIG. 1, the serving and home networks may support a plurality of UEs, according to particular embodiments.

One example way to maintain the confidentiality of a UE's long-term subscription identifier is to protect the long-term subscription identifier using a home network public key. The home network public key may be provisioned within the UE 1 without a certificate, such that a global public key infrastructure (PKI) or certificate authority (CA) is not required (i.e., because the technique is used asymmetrically between the UE and a function in the home network 3). In such an example, the UE may be expected to encrypt the long-term subscription identifier, which is then transmitted towards the home network, using the home network public key.

Figure 2:
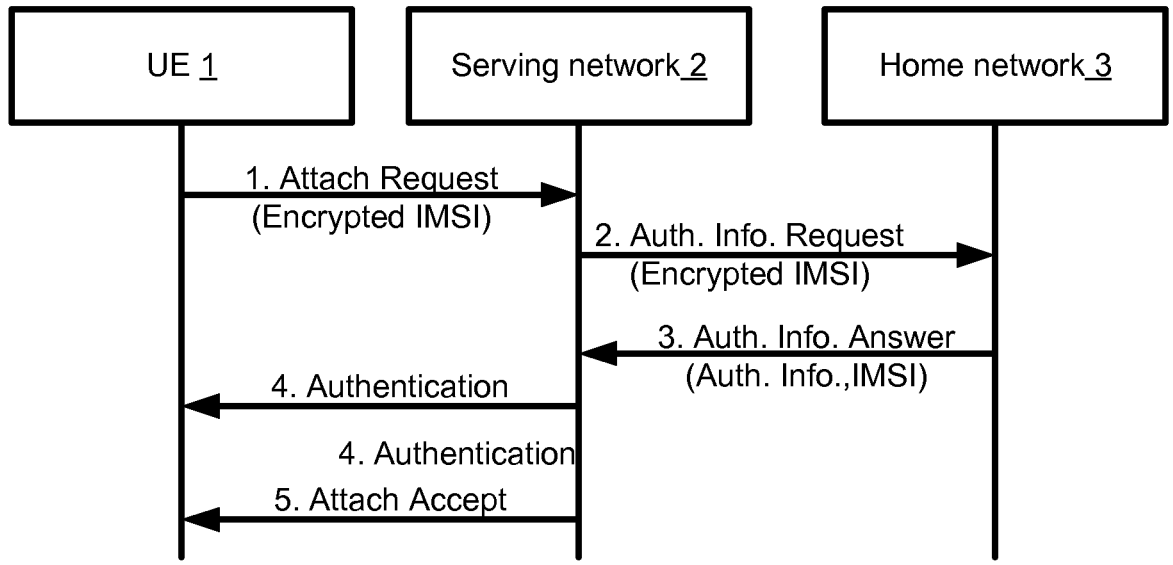
FIG. 2 illustrates an example in which a UE encrypts its long-term subscription identifier as part of an attachment procedure.

FIG. 2 illustrates one such particular example in which the UE encrypts its long-term subscription identifier as part of an attachment procedure. According to the example of FIG. 2, the UE 1 encrypts its IMSI, leaving its MCC (Mobile Country Code) and MNC (Mobile Network Code) parts in clear-text, and sends an Attach Request to the serving network 2 with the encrypted IMSI as its identifier (step 1). The serving network identifies the UE's home network 3 using clear-text MCC/MNC and requests authentication information from the UE's home network using the encrypted IMSI as the UE's identifier (step 2). The home network decrypts the IMSI from the encrypted IMSI and fetches the corresponding authentication information. In response to the authentication information request, the home network sends the UE's authentication information along with the clear-text IMSI to the serving network (step 3). The serving network performs an authentication procedure with the UE to authenticate the UE (step 4). If the authentication procedure succeeds, the serving network sends an Attach Accept message to the UE (step 5).

In such an approach, the home network public key may be pre-provisioned in a USIM and/or may be provisioned using an OTA (Over-the-Air) provisioning procedure. Although the approach illustrated in FIG. 2 does protect the long-term subscription identifier in at least some embodiments, some such embodiments may include one or more deficiencies. For example, the approach illustrated in FIG. 2 may be frustrated by legacy USIMs that cannot be feasibly changed, certain home operators that may not support OTA provisioning, and/or USIMs that may not be updatable (e.g., due to technical limitations, lack of storage space, or other limitations).

Various embodiments of the present disclosure provide alternatives to at least some aspects of the particular embodiment illustrated in FIG. 2, which corresponds to FIG. 3-8: Interactions between components in the document "Deliverable D3.6 5G-PPP Security enablers open specifications (v2.0)". Particular embodiments enable the public key of the home network 3 to be provisioned (e.g., newly or refreshed) and stored in the UE 1, such that the UE 1 is able to encrypt its subscription identifier with this public key. Moreover, in particular embodiments, the core network (such as a 5GC (5G core) network) triggers the provisioning of the home network public key over existing traffic procedures defined by 3GPP (e.g., registration/authentication signaling, e.g. Non Access Stratum messages between the UE and the an AMF/SEAF node in relation to a registration procedure) without the need to rely on additional infrastructure and out-of-band procedures such as performing an OTA update procedure.

Although various embodiments herein will describe certain features or actions performed by the UE 1, it should not be presumed that such features or actions are performed by any particular component of the UE unless otherwise specified. For example, such functions may or may not be performed by a UICC, USIM, embedded UICC, integrated UICC or other circuitry and/or software of the UE (e.g. baseband circuitry in the ME), depending on the particular embodiment.

Particular embodiments include a Subscription Permanent Identifier (SUPI). A SUPI is a clear-text, globally unique, 5G, permanent identifier allocated to each subscriber in a 5G system. The SUPI may be IMSI-based or non-IMSI based. Embodiments that include an IMSI-based SUPI may use the IMSI as described in 3GPP TS 23.003 V15.0.0, for example. Embodiments that include a non-IMSI based SUPI may be based on a Network Access Identifier (NAI) according to the NAI IETF RFC 4282 based user identification described in 3GPP TS 23.003 V15.0.0. In some embodiments, the SUPI contains the address of the home network (e.g. the MCC and MNC in the case of an IMSI based SUR). Such embodiments may enable certain roaming scenarios, e.g., by providing the serving network 2 with information useful for identifying the UE's home network 3. In case the SUPI is a NAI, it may also contain the IMSI, but it may also be non-IMSI based.

Figure 3:
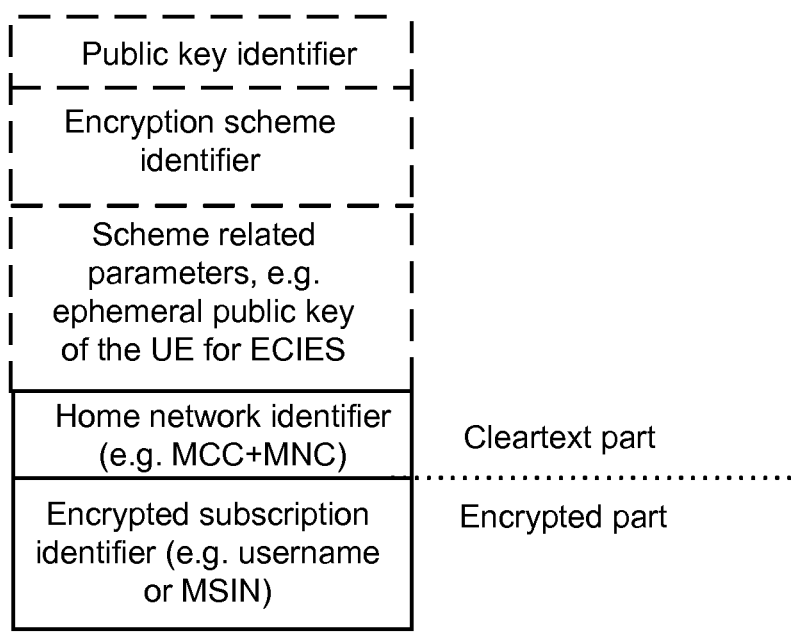
FIG. 3 illustrates an example of a Subscription Concealed Identifier (SUCI).

Particular embodiments additionally or alternatively include a Subscription Concealed Identifier (SUCI), such as illustrated in the example of FIG. 3. A SUCI is a protected version of a SUPI. The SUCI includes a clear-text part and an encrypted part.

The clear-text part includes a home network identifier that identifies the home network of the UE 1. For example, the SUCI may include an MCC and MNC of the home network. The clear-text part may also include a public key identifier, an encryption scheme identifier, and/or scheme related parameters useful for decrypting the encrypted part of the SUCI according to an encryption scheme, such as an ephemeral public key of the UE or other parameters for use in Elliptic Curve Integrated Encryption Scheme (ECIES) or other encryption scheme. The term ephemeral key is known to the person skilled in the art and is defined as a key whose use is restricted to a short time period, such as a single telecommunication connection (or session), after which all traces of it is eliminated. As will be discussed below, the public key identifier is an identifier that may be used within the home network to identify the correct SIDF in a home network that includes a plurality of SIDFs. The ECIES, the public key identifier, and SIDFs will be described in greater detail below. The skilled person understand that 'clear-text part' within the context of the SUCI means that the information therein is non-concealed/not encrypted information.

When the encrypted part is included in the SUCI, the SUCI is a protected version of SUPI. The encrypted part includes an encrypted subscription identifier, such as an MSIN (Mobile Subscription Identification Number) or username. The username may be the whole or a part of the characters that comes before the '@' in a NAI, e.g. username@mnc<MNC>.mcc<MCC>.3gppnetwork.org. In this example, all characters before the '@' are encrypted. In the case of a Decorated NAI, which has the form 'homerealm!username@otherrealm', only the username part of the text to the left of the '@' is encrypted, since the homerealm might be used as routing information. Thus, decrypting the encrypted part of the SUCI may be performed to learn the corresponding SUPI. ECIES is an example of a public key encryption scheme that may be used to generate a SUCI from a SUPI and/or a SUPI from a SUCI. As will be discussed further below, the encrypted part of the SUCI may use a null encryption scheme, e.g., if the UE 1 has not been provisioned with the public key of the home network.

A SIDF is a function located in the home network that is responsible for decrypting the SUCI. Particularly in 5G architecture, a SIDF may be co-located in UDM (Unified Data Management). The SIDF may alternatively be said to be a part of the UDM or provided by the UDM. Additionally or alternatively, a SIDF may be an entity separate from UDM and/or co-located with an AUSF (Authentication Server Function).

Figure 4:
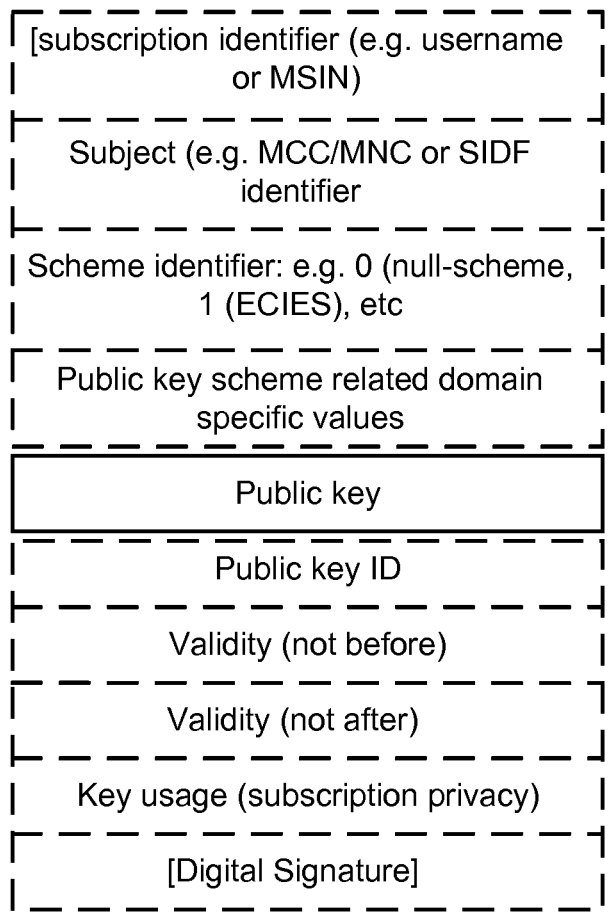
FIG. 4 illustrates an example of a privacy key.

FIG. 4 illustrates an example of a privacy key. This particular example of the privacy key includes a public key of the home network. In some embodiments, the privacy key also includes one or more public key scheme related parameters, the long-term subscription identifier, a subject field indicating a network, domain, or context to which the privacy key pertains (e.g., the subject may be a home network identifier, such as an MCC/MNC), a public key scheme identifier, public key scheme related domain specific values (e.g. values for the elliptic curve domain in case of ECIES scheme), the public key identifier as will be discussed in greater detail below, validity times indicating specifying when the privacy key is valid (e.g., not valid before and/or not valid after times), a key usage field indicating one or more ways the key may be used (e.g., subscription identifier privacy, slice selection privacy, etc.), and/or a digital signature calculated over some or all of the privacy key.

In particular, the key usage field may be set to indicate that the key is useful for "subscription privacy," in accordance with embodiments of the present disclosure. Uses of the privacy that are beyond the scope of the present disclosure may additionally or alternatively indicate other uses for the privacy key. For example, the private key may be used for "Network Slice Selection Assistance Information (NSSAI) privacy" purposes instead of, or in addition to, "subscription privacy" purposes. Indeed, such other purposes may include similar methods, devices, and systems in the UE 1 and/or in the home network for initial provisioning, refresh, and other features as described herein. Although one privacy key may, in some embodiments, indicate multiple usages, other embodiments may include respective privacy keys for respective usages, the key usage field of each privacy key indicating a single key usage (e.g., one of the privacy keys may indicate "subscription privacy" and the other may indicated "NSSAI privacy"). The key usage field may be formatted as an integer, one or more enumerated values, an alphanumeric string, a bit string, a delimited string, and/or an array of any of the above-mentioned formats, among other things.

A 3GPP public key privacy scheme (3GPK schemes) is a standardized public key scheme that a UE 1 may support for interoperability between the UE and, e.g., a mobile operator. In absence of a standardized scheme, UE vendors would likely need to coordinate with such operators to implement privacy mechanisms. According to particular embodiments, the UE should support whichever schemes are allowed and/or standardized so that the home network is able to freely choose a scheme without creating any interoperability difficulties. One such scheme in particular is, for example, ECIES. Particular schemes may be adopted by as standard, and given an identifier (also called a "register") for interoperability. For each such scheme, any specific algorithms that need to be supported may also be specified. For example, in the case of ECIES, key agreement (KA), key derivation (KD) function (KDF), symmetric integrity, and symmetric encryption may be specified. One or more parameters relating to such a scheme, as well as (in one or more cases) their potential static values may also be specified. For example, in ECIES, elliptic curve domain parameters (p, a, b, G, n, h) for a curve over a prime field and/or (m, f(x), a, b, G, n, h) for a curve over a binary field may be specified.

Figure 5:
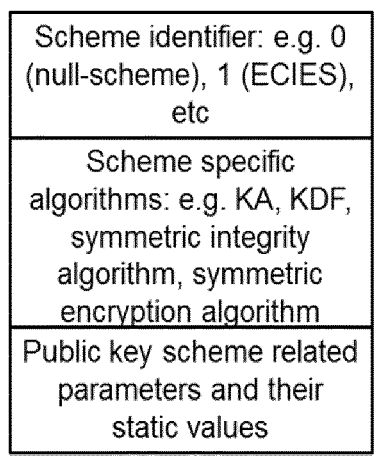
FIG. 5 illustrates a 3GPP public key privacy scheme.

FIG. 5 illustrates an example 3GPK scheme. Each scheme adopted as standard may be assigned a specific identifier. For example, the null-scheme may be assigned a 0, ECIES may be assigned a 1, and so on. Other embodiments may format the scheme identifier in other ways, including but not limited to one or more integers, numeric strings, alphanumeric strings, bit strings, and/or other data types.

Figure 6:
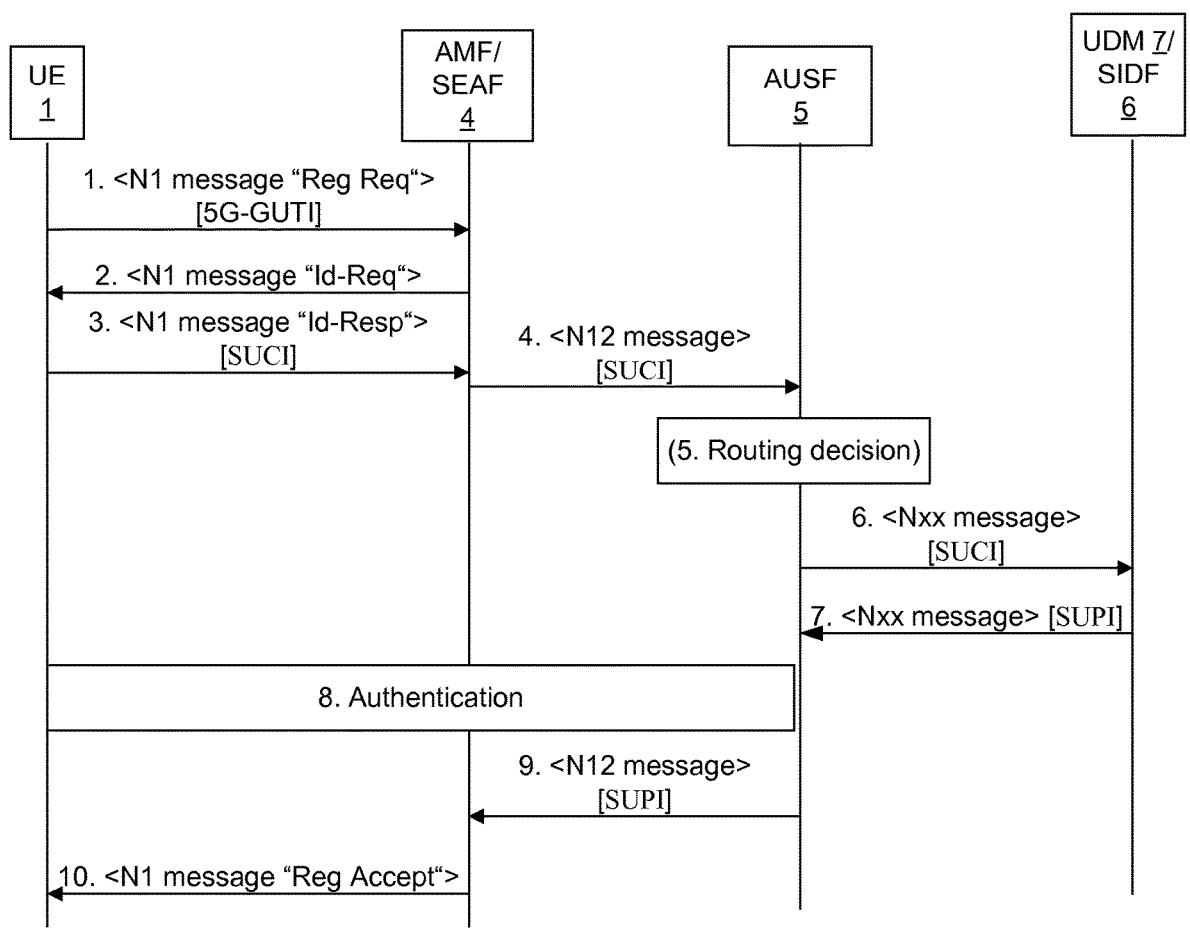
FIG. 6 illustrates an example of a registration procedure.

According to embodiments herein, the UE registers with the wireless communication network 30 according to a registration procedure, such as the example registration procedure illustrated in FIG. 6. According to the example registration procedure illustrated in FIG. 6, the UE uses a public key of the home network to conceal a long-term subscription identifier. Although one or more particular interfaces illustrated in FIG. 6, such as those specified by an N followed by a numerical designation (e.g., N1, N12, N13), are in accordance with 3GPP TS 23.501, the signaling performed over such interfaces as described herein, as well as other of the interfaces themselves (e.g., Nxx), are not known or described in any known art.

According to the example of FIG. 6, the UE 1 includes a temporary identifier (e.g., a 5G-GUTI) in a registration request and sends the registration request to an AMF/SEAF 4 (step 1). The AMF/SEAF, failing to recognize the 5G-GUTI, transmits an identifier request message to the UE to request the UE's identifier (step 2). The UE responds to the identifier request message with an identifier response message comprising a SUCI (step 3). The AMF/SEAF requests authentication of the UE from the AUSF 5 in the home network 3, and includes the SUCI in the authentication request (step 4). The AUSF uses information encoded in the SUCI to determine which of a plurality of SIDFs to use to decrypt at least part of the SUCI (step 5). In particular, the AUSF may use the public key identifier carried in the SUCI (or otherwise present in the authentication request message) to identify the correct SIDF 6. In some embodiments, the AUSF may additionally or alternatively use the scheme identifier to identify the correct SIDF. In other words, different SIDFs may handle different encryption schemes (e.g., a first SIDF may handle ECIES and a second SIDF may handle RSA), and the AUSF may choose an appropriate SIDF based on which scheme is identified by the SUCI. In yet an alternative embodiment, the information used to identify the correct SIDF 6 may be a parameter or ID which indicates the SIDF 6 and which parameter/ID is stored or provisioned to the tamper resistant secure hardware.

Embodiments of the present disclosure may include multiple SIDFs to avoid having a single point of failure for networks having a large number of subscribers, for example. Consequently, distributed SIDF deployments may be advantageous to improve the fault tolerance, load balancing, and/or overall capacity of the network. Additionally or alternatively, different SIDF instances may be deployed to handle different sets of home network public keys. Accordingly, the public key identifier in the SUCI may be used to select the proper SIDF instance(s), according to one or more embodiments herein. Alternatively, in particular embodiments that only have one SIDF deployed, the public key identifier may be omitted from the SUCI.

The AUSF 5 sends the SUCI to the selected SIDF 6 (step 6). If the SIDF is co-located in UDM 7 (such that the Nxx message in step 6 of FIG. 6 is a N13 message, for example), then the same message may be used to request an authentication vector or authentication credentials from the UDM. The SIDF decrypts the SUCI to obtain a corresponding SUPI, and returns the SUPI to the AUSF (step 7). If the SIDF is co-located in UDM, then the same message may be used to return authentication vector/credentials to AUSF.

AUSF 5 and UE 1 exchange authentication messages using authentication vectors/credentials received from the UDM 7 (step 8). If the AUSF has not already received the required authentication vector/credentials from the UDM (e.g., in step 7 discussed above), the AUSF may request authentication vector/credentials from the UDM before initiating authentication with the UE (not shown). Alternatively, the AUSF may have delegated the authentication to SEAF. In such embodiments, the AUSF may simply forward the SUPI to the SEAF in this step, and rely on the SEAF to perform the authentication in the next step.

Continuing with the example in which the AUSF 5 successfully authenticates the UE 1, the AUSF returns the SUPI to the AMF/SEAF 4 (step 9). The AMF/SEAF accepts the registration of the UE and transmits a registration acceptance message to the UE (step 10).

Figure 7:
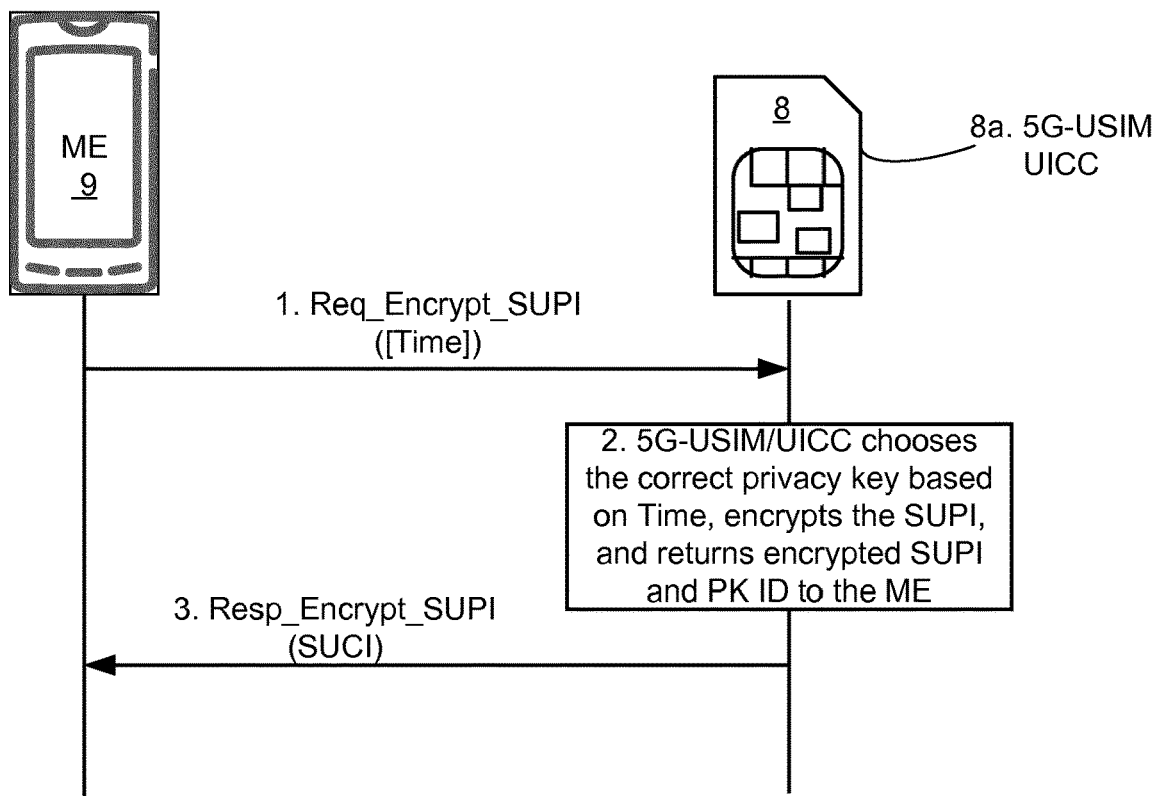
FIG. 7 illustrates an example in which a 5G-USIM/UICC of a UE generates the SUCI.

As briefly discussed above, particular features of the UE 1 may be performed by a tamper resistant secure hardware component 8 of the UE. FIG. 7 illustrates a particular example in which a 5G-USIM/UICC 8*a* of a UE generates the SUCI. Although this particular example uses the term 5G-USIM/UICC, this term should not be considered as limiting with respect to any version or vendor of USIM or UICC technology, nor should this term be considered as limiting with respect to any generation of mobile network, e.g., 2G/3G/4G/5G.

According to the example of FIG. 7, an ME 9 requests a SUCI (step 1). In some such embodiments, this SUCI request may include the time. In other such embodiments, the request may simply be a read operation from the 5G-USIM/UICC 8*a*. According to such embodiments in which there are multiple home network public keys, the 5G-USIM/UICC chooses the correct corresponding privacy key (e.g., based on the time), and generates the SUCI using the selected privacy key (step 2). Alternatively, if such embodiments in which there is only one privacy key, the 5G-USIM/UICC simply uses that privacy key. The 5G-USIM/UICC then returns the SUCI to the ME (step 3).

Figure 8:
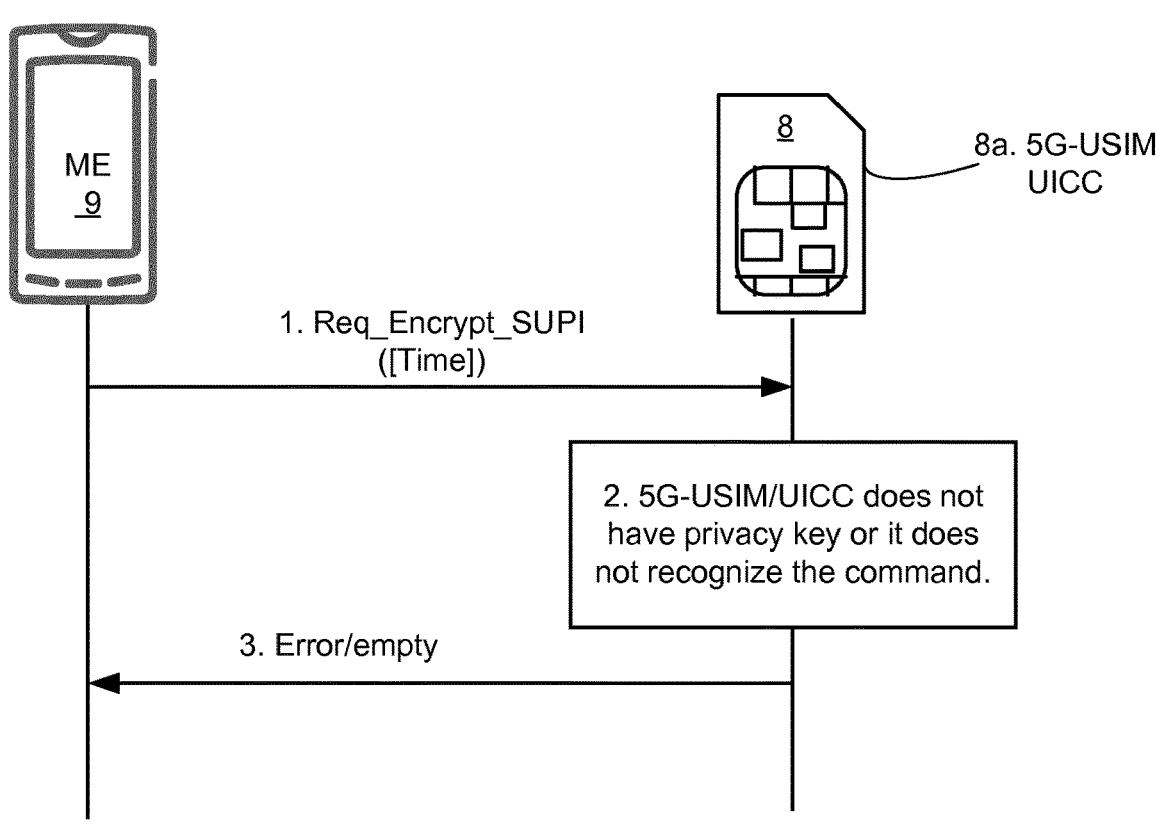
FIG. 8 illustrates an example in which the 5G-USIM/UICC does not have a privacy key.

FIG. 8 illustrates an example in which the 5G-USIM/UICC does not have a privacy key, or does not support the feature.

According to the example of FIG. 8, the ME 9 requests a SUCI with a request (which may include the time, in some embodiments) in similar fashion as described above with respect to FIG. 7. In this example, however, the 5G-USIM/UICC 8*a* does not have privacy key or does not recognize the command because it does support the feature (step 2). Accordingly, the 5G-USIM/UICC returns an error message (or empty data) to the ME (step 3).

Alternatively to the example of FIG. 8, the ME 9 may know that 5G-USIM/UICC 8*a* does not have privacy key or does not support privacy key by other means, according to particular embodiments. For example, the ME may obtain the version and or vendor information of 5G-USIM/UICC and determine, based on this information, that a privacy key is not supported or present. As another example, the ME may determine that a privacy key is not supported or present in 5G-USIM/UICC based on some other response message from the 5G-USIM/UICC.

Figure 9:
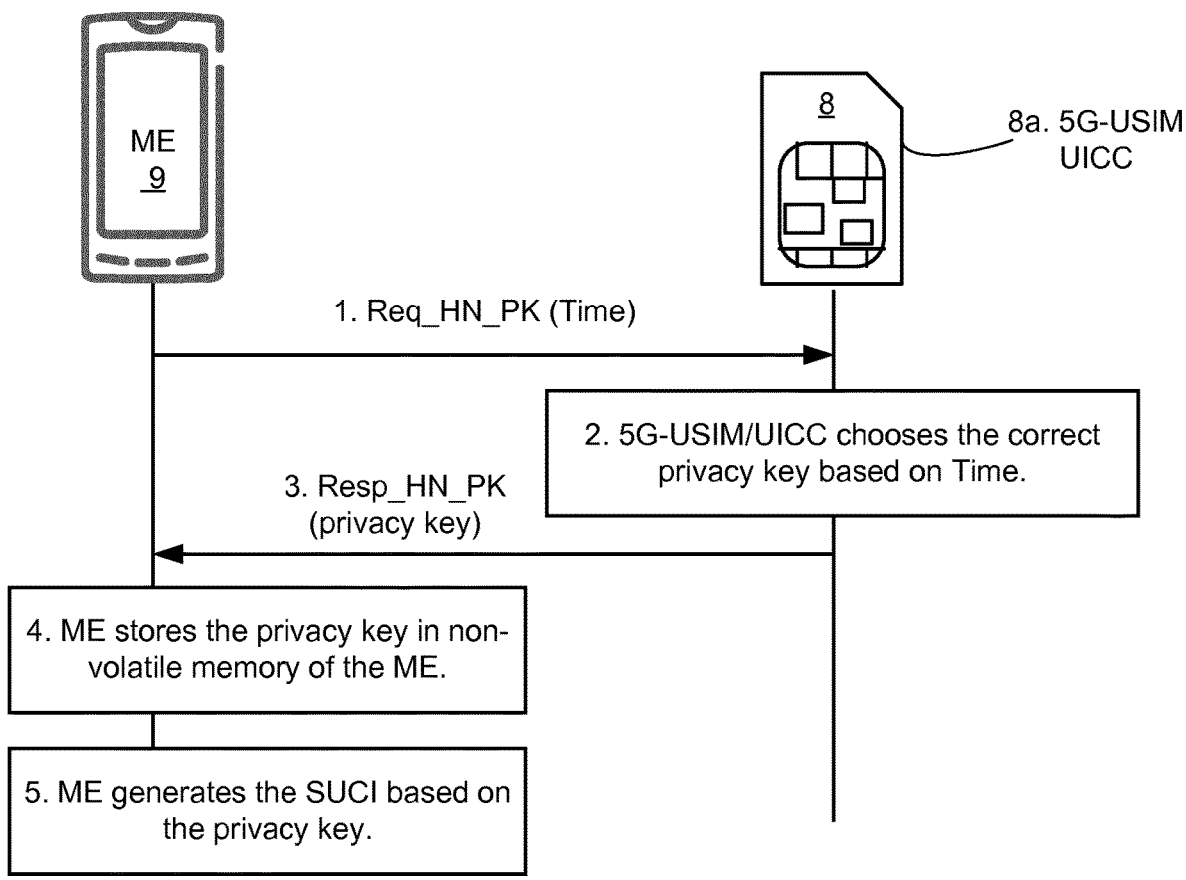
FIG. 9 illustrates an example in which an ME generates the SUCI.

FIG. 9 illustrates an example in which the ME 9 generates the SUCI, but the privacy key itself is stored in the 5G-USIM/UICC 8*a*.

According to the example of FIG. 9, the ME 9 has no privacy key and requests one from the 5G-USIM/UICC 8*a* (step 1). In some embodiments, the request includes the time. In other embodiments, the request is a direct read operation from the 5G-USIM/UICC memory. The 5G-USIM/UICC then chooses the privacy key (e.g., based on time, if provided in the request) (step 2). The 5G-USIM/UICC returns the privacy key to the ME (step 3). At this point, the ME may, in some embodiments (but not necessarily all embodiments) store the privacy key and/or the SUPI to a non-volatile memory of the ME (step 4). The ME then generates the SUCI based on the SUPI and the privacy key (step 5).

Figure 10:
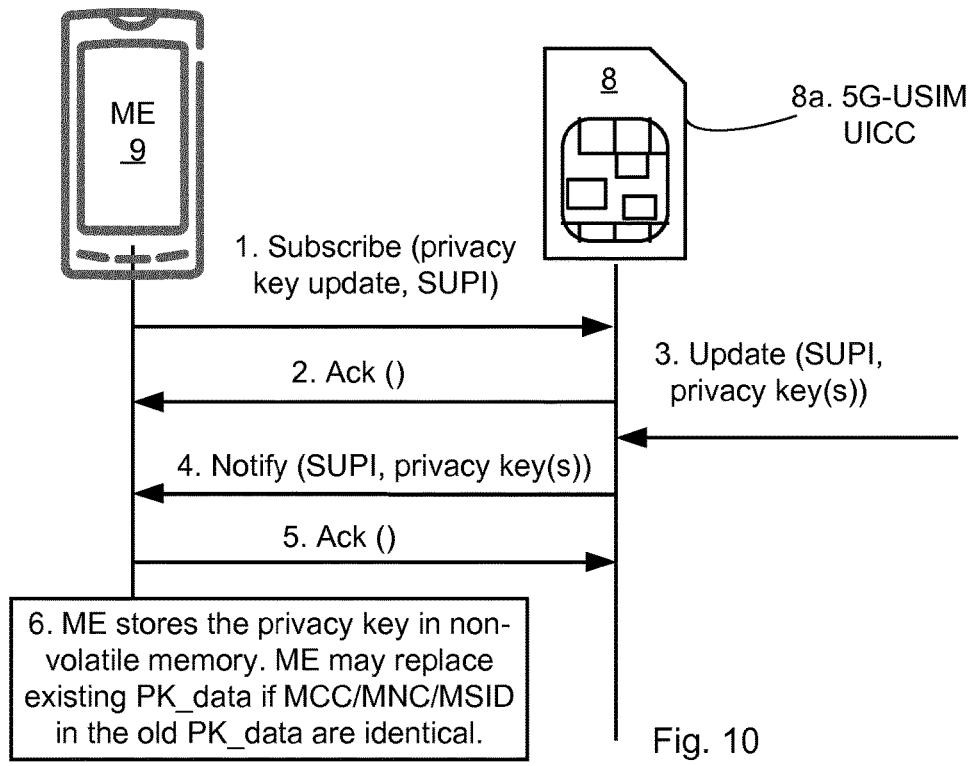
FIG. 10 illustrates an example in which the ME is notified about an updated privacy key.

FIG. 10 illustrates an example in which the ME 9 gets notified if the privacy key is updated in the 5G-USIM/UICC 8*a*. In this scenario, the ME subscribes to changes in the privacy keys, and gets notifications when updates are available. This scenario assumes that the ME stores the privacy key or asks the 5G-USIM/UICC for the privacy key as needed to obtain the latest privacy key.

According to the example of FIG. 10, the ME 9 sends a request to the 5G-USIM/UICC 8*a* requesting to subscribe to privacy key updates (step 1). The request may, in some embodiments, include a SUPI. The 5G-USIM/UICC accepts the subscription and transmits an acknowledgement to the ME in response (step 2). When the home network updates the privacy key(s) or delivers one or more new ones to the 5G-USIM/UICC (step 3), the 5G-USIM/UICC notifies the ME that one or more new privacy keys are available (step 4). Although FIG. 10 depicts the notification message including the privacy key(s), according to other embodiments, the ME may alternatively read the key from the 5G-USIM/UICC based on the notification. The ME acknowledges the notification (step 5). The ME then stores the new privacy key(s) to the non-volatile memory of the ME (step 6). The ME may replace existing privacy key data if MCC/MNC/MSID in previously stored privacy key data are identical.

Figure 11:
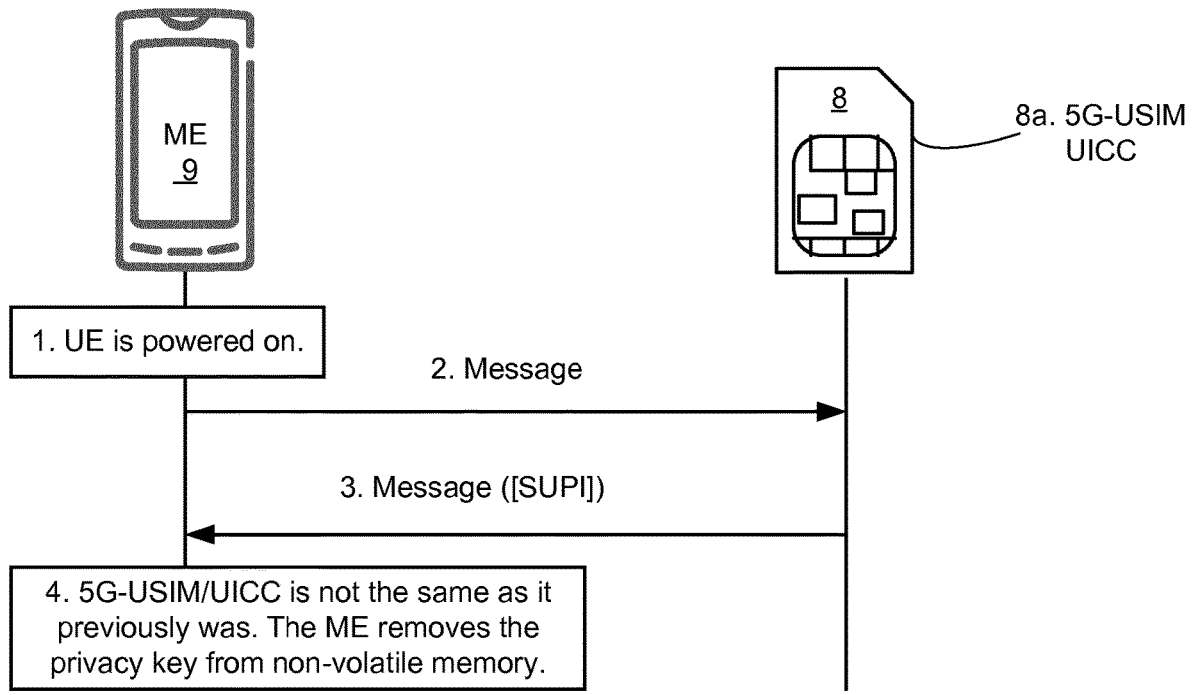
FIG. 11 illustrates an example in which the ME detects that the 5G-USIM/UICC has been replaced.

FIG. 11 illustrates an example in which the UE is powered on, and the ME 9 detects that the 5G-USIM/UICC 8a has been replaced (e.g., with a different 5G-USIM/UICC, or simply removed and reinserted, according to various embodiments). Although particular embodiments may treat replacement with a different 5G-USIM/UICC the same as a removal and reinsertion (e.g., for security reasons), other embodiments may respond differently based on which of these two scenarios is detected.

According to the example of FIG. 10, the UE 1 is powered on (step 1). The ME 9 sends a message to the 5G-USIM/UICC 8a (step 2) and the 5G-USIM/UICC responds in a manner that is inconsistent with when the UE was previously powered on (step 3). For example, the response message may include a different SUPI than any previously seen by the ME.

The ME 9 determines that the 5G-USIM/UICC 8a has been replaced (step 4). For example, the 5G-USIM/UICC may be different in some way from the previous time when the UE 1 was powered on, indicating that the 5G-USIM/UICC has been replaced with a different one. Alternatively, the ME may detect that the 5G-USIM/UICC has been replaced using non-volatile memory that is updated by a mechanical, electrical, or software mechanism, such as an optical sensor, switch, weight sensor, pressure sensor, and/or electrical circuitry that is triggered when 5G-USIM/UICC is removed and/or inserted, e.g., regardless of whether the same 5G-USIM/UICC or a different one has been removed and reinserted.

The ME 9 removes the privacy key it had previously stored from the non-volatile memory (if there is one). Additionally or alternatively, if the ME stored the SUPI of the old 5G-USIM/UICC with the privacy key to its memory, the ME may decide to remove the privacy key from the non-volatile memory based on a comparison of the SUPI returned by the new 5G-USIM/UICC 8a with the SUPI stored with the old privacy key.

Particular embodiments described above describe ways in which the devices within a wireless communication system may securely exchange a subscription identifier, including the generation and use of particular data structures and corresponding encryption/decryption schemes. In particular, embodiments described above allow for this secure exchange to be performed as part of registering the UE 1 with the wireless communication network 30. Many such embodiments presume that the UE is provisioned with a valid privacy key.

Figure 12:
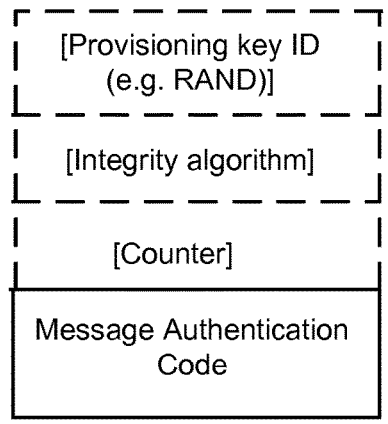
FIG. 12 illustrates an example of Privacy Key Verification Data.

To ensure that the UE 1 does, in fact, have a valid privacy key, further embodiments of the present disclosure describe ways in which to provision the UE. Particular embodiments relating to provisioning may include Privacy Key Verification Data (MAC-P). As shown in the example of FIG. 12, a MAC-P includes a message authentication code (MAC). The MAC is calculated based on the privacy key and a provisioning key (which will be explained in greater detail below). For example, the MAC may be calculated over the various fields of the privacy key, including but not limited to the home network public key and its related parameters as described above, in combination with the provisioning key.

The MAC-P may, according to some embodiments, also include a provisioning key identifier (e.g. a RAND) and/or an integrity protection algorithm identifier. According to some embodiments in which the MAC-P does not include the integrity protection algorithm identifier, the integrity protection algorithm to be used may be identified separately from the MAC-P, or a predefined Key Derivation Function (KDF) such as, e.g., HMAC-SHA-256 may be used. The MAC-P may additionally or alternatively include a counter field, which may be used to identify the MAC-P from a plurality of MAC-Ps (e.g., in cases where more than one MAC-P is calculated using the same provisioning key). The relationship between the privacy key (e.g., as shown in FIG. 4) and the MAC-P (e.g., as shown in FIG. 12) is further explained below with respect to FIG. 15.

The provisioning key is a secret shared between the UE 1 and a PKPF 10 (see FIG. 13), which is described in further detail below. The provisioning key is UE-specific, i.e. it is a key which in the home network 3 is associated with the UE and/or the 5G USIM, UICC 8a or any other hardware in the UE/ME in which a SIM/USIM is allowed to be stored. In some embodiments, the provisioning key may be derived from the home network master key, e.g. $K_{AUSF}$ in a 5G or future network as created in e.g. 5G AKA, EAP-AKA' and EAP-TLS (Extensible Authentication Protocol-Transport Layer Security), that is created when the UE 1 authenticates with the network. In some such embodiments, the AUSF may have the home network master key. Further, a new home network master key may be created when the UE re-authenticates.

According to one example, the provisioning key may be created from a CK (Ciphering Key), IK (Integrity Key) (e.g., by applying a KDF such as HMAC-SHA-256 or other secure one-way hash function, such as SHA-256, or a concatenation of CK and IK). The provisioning key may, alternatively to a direct generation from the master key or CK/IK, be generated from CK' and IK' as generated from CK and IK in the EAP-AKA' method. In another alternative, the provisioning key may be generated from EMSK (Extended Master Session Key) in the case of EAP-TLS as specified in RFC5216. As the same home network master key may be used to derive numerous keys, embodiments of the present disclosure use at least one further standard parameter in combination with the home network master key as input for deriving the provisioning key. For example, when standard KDF is used, the FC (Function Code) may be used as an input (e.g., as specified in TS 33.220, such as TS33.220 V15.0.0) to produce a provisioning key that is distinguishable from other keys produced using the home network master key.

According to another example, the provisioning key may be a key which is same as, or derived from, an ephemeral shared key that is shared between the SIDF 6 and the UE 1, particularly when the encryption scheme used is a hybrid public key scheme such as ECIES. For example, ECIES uses a public key mechanism (e.g., Diffie-Hellman) for key agreement that results in a shared key, which is ephemeral, between the SIDF and the UE. That ephemeral shared key, for security purposes, is generally processed further through a key derivation function (e.g., SHA-256) to derive yet other derived shared keys between the SIDF and the UE (e.g., encryption key and MAC key in ECIES). One of these other derived shared keys is generally used for encryption and is called the ephemeral encryption key. As applied to embodiments of the present disclosure, one of these other derived shared keys may be used, e.g., to generate a SUCI from a SUPI. Further, in some embodiments, another of the derived shared keys (e.g., MAC key in ECIES), a new one further derived from one of the derived shared keys, or yet another key derived from the ephemeral shared key, may be used as the provisioning key. In some embodiments in which the SIDF has, or is able to obtain/derive the provisioning key, the SIDF may also calculate the MAC or MAC-P.

The PKPF 10 is a function located in the home network 3 that is responsible for provisioning the privacy key. According to particular embodiments, the PKPF may be co-located with the AUSF 5, and particularly in at least some embodiments in which the provisioning key is derived from the home network master key that is created based on primary authentication between UE and the network. In other embodiments, the PKPF may be collocated with other 5GC entities, such as UDM 7. According to yet other embodiments, the PKPF is its own separate entity. In some embodiments, the SIDF 6 and PKPF are implemented together as a single function, and there is no need to transfer the provisioning key. In some other embodiments, the PKPF may obtain the provisioning key from the SIDF. The PKPF may also obtain the MAC/MAC-P from the SIDF.

Figure 13:
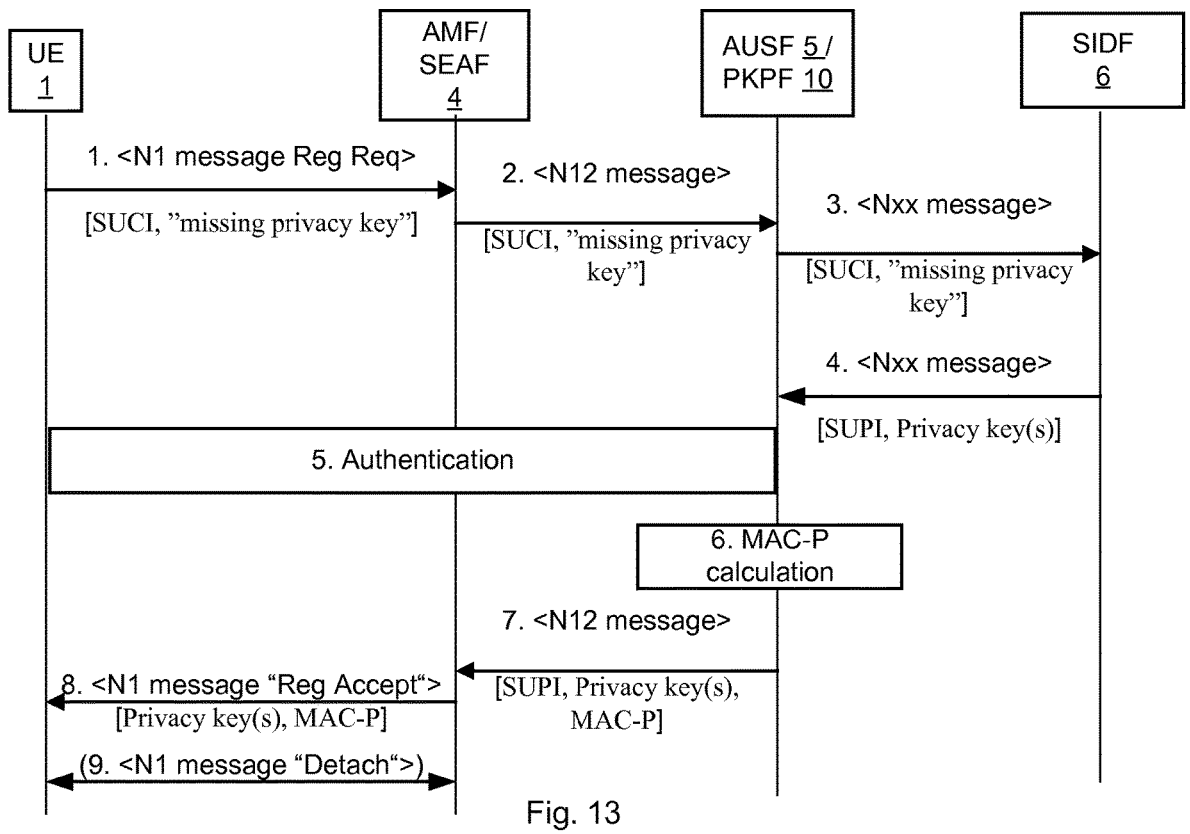
FIG. 13 illustrates an example UE Registration process in which the UE has no valid privacy key.

FIG. 13 illustrates an example UE Registration process in which the UE 1 has no valid privacy key. For example, the end-user may have inserted a new USIM/UICC into the UE, and this new USIM/UICC does not contain a privacy key.

According to the example illustrated in FIG. 13, the UE 1 sends a Registration request to an AMF/SEAF 4, including a SUCI in the request (step 1). Because the UE initially has no privacy key in this scenario, the UE uses a null-scheme or null-encryption method to create the SUCI. Further, because the UE has no privacy key that would indicate the null-scheme or null-encryption method (which the home network may be free to choose, according to embodiments), an explicit or implicit indicator that the actual privacy key is missing from the UE may be used, according to particular embodiments. For example, as discussed above, the SUCI may use a null encryption scheme for the encrypted part, which may implicitly signal that the privacy key is missing. Alternatively, a "missing privacy key" indicator may be, e.g., a standardized or well-known public key identifier value, a flag and/or a message type indicator (e.g., a registration request of type "privacy provisioning" or "pre initial registration").

The AMF/SEAF 4, having received the registration request, requests UE authentication from the AUSF 5/PKPF 10 (step 2). The AUSF sends the SUCI (and the "missing privacy key" indicator, if one was included in the authentication request) to a SIDF 6 (step 3). According to embodiments in which the SIDF is co-located in UDM 7 (e.g., the Nxx message is a N13 message), then the same message may be used to request an authentication vector/credentials from the UDM.

The SIDF 6 sees that the SUCI is in cleartext, and that the UE 1 is missing a privacy key. According to this example, the SIDF has a local policy that all SUCIs must be protected using ECIES. Accordingly, the SIDF returns a SUPI to the AUSF, together with a request to provision the ECIES privacy key to the UE (step 4). In some embodiments, the response includes multiple privacy keys to be provisioned to the UE. According to embodiments in which the SIDF is co-located in UDM 7, then the same message may be used to return the authentication vector/credentials to the AUSF 5.

According to embodiments in which the AUSF 5 has not received the authentication vector/credentials from UDM 7 already, the AUSF 5 may request said authentication vector/ credentials from UDM before initiating the authentication with the UE (not shown). Alternatively, according to embodiments in which the AUSF has received the authentication vector/credentials from UDM already, the AUSF and UE exchange authentication messages using said authentication vectors/credentials (step 5). Alternatively, the AUSF may have delegated the authentication to the AMF/ SEAF 4.

According to this example, the PKPF 10 is co-located with the AUSF 5. Consequently, upon successful authentication, the AUSF/PKPF creates a provisioning key that may be used to protect the privacy key provisioning message to the UE 1, i.e., without the need to exchange signaling to transfer the provisioning key. According to other embodiments in which the AUSF and PKPF are not co-located, the AUSF may request that the provisioning key be generated by the PKPF and the PKPF may transfer the provisioning key to the AUSF in response (not shown).

The AUSF 5/PKPF 10 protects the privacy key(s) (received from SIDF 6 in step 4) with the provisioning key by calculating a MAC (e.g., as described above with respect to FIG. 12) and constructing MAC-P (step 6). In some embodiments, the privacy key may also be encrypted. In some embodiments, the AUSF/PKPF may receive the MAC and/ or MAC-P from the SIDF, as described above, particularly in at least some embodiments in which the provisioning key is based on the ephemeral shared key of, e.g., an EICES scheme. In particular, as discussed above, the SIDF may have generated the MAC and/or MAC-P.

The AUSF 5 then returns the SUPI, the privacy key(s), and the MAC-P to AMF/SEAF 4 (step 7). In some embodiments, the SUPI, the privacy key(s), and/or the MAC-P are transmitted to the AMF/SEAF in the same registration related message flow for registering the UE 1 with the wireless communication network 30. In some embodiments, the SUPI, the privacy key(s), and/or the MAC-P are transmitted to the AMF/SEAF in a separate message flow (not shown).

According to embodiments in which the AUSF 5 delegated authentication of the UE 1 to the AMF/SEAF 4, the AMF/SEAF may authenticate the UE at this point (not shown). In such embodiments, the AMF/SEAF may have received the SUPI, the privacy key(s), and the MAC-P previously, e.g., directly from the SIDF 6 in step 4.

The AMF/SEAF 4 accepts the registration of the UE 1, and forwards the privacy key(s) and the MAC-P to the UE, e.g., in a registration acceptance message (step 8). The UE then attempts to verify the MAC, and if successful, stores the privacy key(s). To verify the MAC, the UE creates the same provisioning key as the AUSF 5/PKPF 10 previously did. In other words, when the UE generates an expected MAC and then compare it with the received MAC, the MAC is verified if the expected MAC is deemed as being the same as the received MAC.

In some embodiments, the UE 1 then detaches from the network (step 9), e.g., to start a new registration procedure using a provisioned privacy key to conceal its subscriber identity, according to one of the embodiments described above. For example, detaching and reregistering in this way may prevent an attacker from linking the SUPI to a temporary identifier of the UE.

Figure 14:
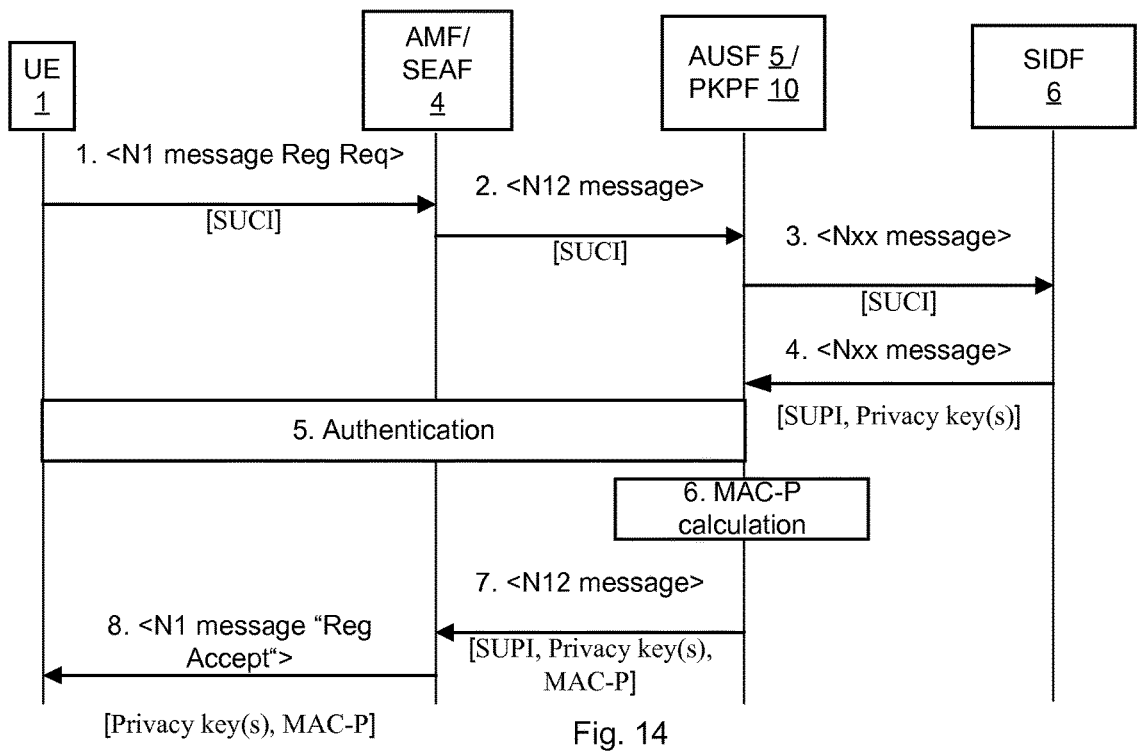
FIG. 14 illustrates an example UE Registration process in which the UE's privacy key needs to be updated.

The UE 1 may, in some embodiments, need to be provisioned with a privacy key due to the expiration or invalidation of a privacy key that was previously provisioned to the UE. FIG. 14 illustrates an example UE Registration process in which the UE's privacy key needs to be updated, e.g., for some security or operational reason. Some reasons that the previously provisioned privacy key may need to be updated, according to various embodiments, may be that the previously provisioned privacy may have reached (or is reaching) its expiry date, security in the wireless communication network 30 has been compromised in some way, and/or the privacy key is subject to regular updates.

According to the example of FIG. 14, the UE 1 sends a registration request to an AMF/SEAF 4 (step 1). The registration request includes a SUCI. In this example, since the UE has a privacy key, the UE uses an encryption scheme or method (e.g., ECIES) to create the SUCI, e.g., according to one of the embodiments described above.

The AMF/SEAF 4 requests UE authentication from a AUSF 5/PKPF 10 (step 2). The AUSF sends the SUCI to an SIDF 6 (step 3). As in the previous example, according to some embodiments in which the SIDF is co-located with UDM 7, then the same message may be used to request an authentication vector/credentials from the UDM.

The SIDF 6 sees that the SUCI is encrypted with a privacy key that needs to be updated. For example, the SIDF may detect that the privacy key is expired or is about to expire, or that the privacy key is invalid for any other reason as previously discussed. The SIDF returns a SUPI to the AUSF 5 together with a request to provision the updated ECIES privacy key to the UE (step 4). According to some embodiments, the response may include several privacy keys. Further, as previously discussed, according to some embodiments in which the SIDF is co-located in UDM, the same message may be used to return the authentication vector/credentials to the AUSF.

The AUSF 5 and UE 1 exchange authentication messages using authentication vectors/credentials received from UDM 7 (step 5). As discussed in previous examples, the AUSF may have received the required authentication vector/credentials from UDM already in step 4 (e.g., in some embodiments in which the SIDF 6 is co-located in UDM), or the AUSF may request such authentication vector/credentials from UDM before initiating the authentication with the UE.

According to embodiments in which the PKPF 10 is co-located with the AUSF 5, the AUSF/PKPF may create a provisioning key used to protect the privacy key provisioning message to the UE 1 as a result of successful authentication. For example, the authentication procedure may include producing a home network master key that may be used to derive the provisioning key. Alternatively, in embodiments in which the PKPF and AUSF are not co-located, the AUSF and PKPF may exchange the provision key through appropriate messaging (not shown).

The AUSF 5/PKPF 10 protects the privacy key(s) (received from SIDF 6 in step 4) with the provisioning key by calculating a MAC and constructing MAC-P, e.g., according to the example illustrated in FIG. 14 (step 6). As discussed above, in some embodiments, the AUSF/PKPF may receive the MAC and/or MAC-P from the SIDF, as described above, particularly in at least some embodiments in which the provisioning key is based on the ephemeral shared key of, e.g., an EICES scheme. In particular, as discussed above, the SIDF may have generated the MAC and/or MAC-P.

After successful authentication, the AUSF 5 sends the SUPI, the privacy key(s) and the MAC-P to the AMF/SEAF 4 (step 7), e.g., in the same registration-related message flow. Other embodiments may use separate message flows for one or more of the SUPI, privacy key(s) or MAC-P. Also, as previously discussed, the AUSF may have delegated authentication of the UE to the SEAF, in which case the SUPI, the privacy key(s), and the MAC-P may have been returned to SEAF already in step 4, and the AUSF performs the authentication as previously described.

The AMF/SEAF 4 accepts the registration of the UE 1, and forwards the privacy key(s) and the MAC-P to the UE, e.g., in a registration acceptance message (step 8). The UE creates the same provisioning key from the primary authentication as AUSF 5/PKPF 10 did, and verifies the MAC in the message. If verification is successful, the UE stores the privacy key(s). The old privacy key may also be removed.

According to yet an example, the AUSF 5 generates the MAC and MAC-P and sends the privacy key(s) and the MAC-P to the UE 1 via the UDM 7, which forwards the privacy key(s) and the MAC-P to the AMF, which then forwards the privacy key(s) and the MAC-P to the UE 1. In such an example the AUSF may be an Home Public Land Mobile Network AUSF and the AMF may in that case be a Visited Public Land Mobile Network (VPLMN) AMF. In such a case, the authentication may have been delegated by the AUSF to the VPLMN AMF.

As previously discussed, the MAC may be calculated based on a privacy key (e.g., as illustrated in FIG. 4) and a provisioning key to generate a MAC-P (e.g., as illustrated in FIG. 12). In some embodiments in which multiple privacy keys are being provisioned to the UE 1, the same MAC may be calculated over all of the privacy keys sent in the same message.

Figure 15:
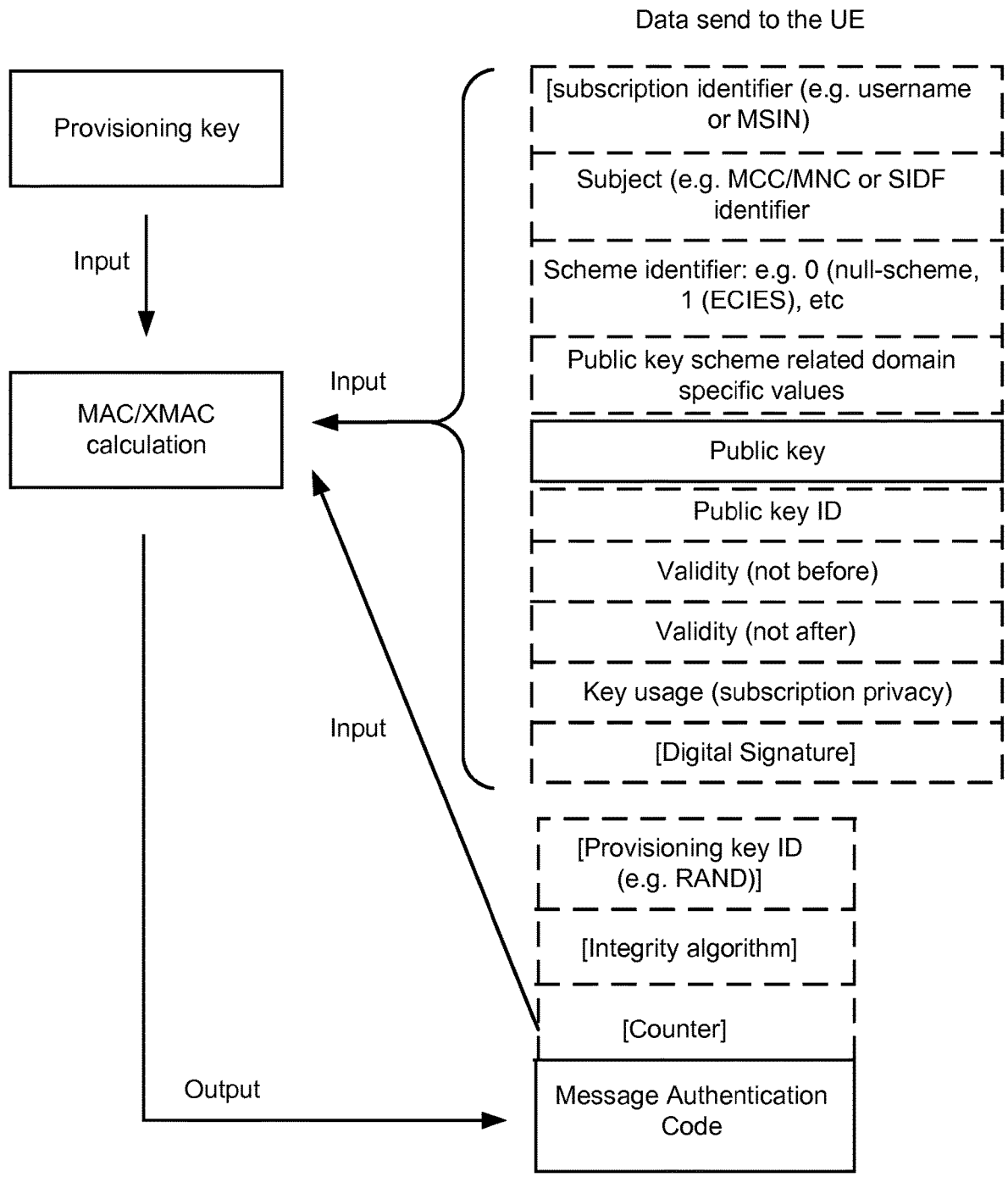
FIG. 15 illustrates an example of how the privacy key and Privacy Key Verification Data are related to each other.

FIG. 15 illustrates an example of how the privacy key and MAC-P are related to each other, and what parameters are used as input to the MAC calculation (or expected MAC (XMAC), as appropriate). As shown in FIG. 15, the provisioning key and privacy key are both used to generate a MAC, which may be then used in combination with another privacy key to update the MAC, and so on until all privacy keys are processed. Once all privacy keys are processed, the privacy key(s) and MAC may be sent to the UE.

Figure 16:
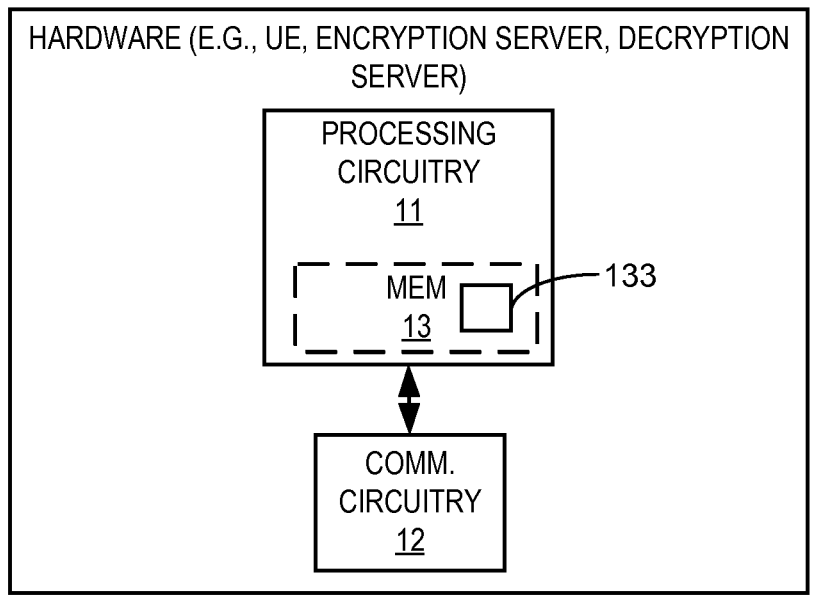
FIG. 16 illustrates a hardware embodiment for e.g. an authentication server.

In view of all of the above, one or more of the devices or functions described above may be implemented using the example hardware illustrated in FIG. 16. The example hardware includes processing circuitry 11 and communication circuitry 12. The processing circuitry is communicatively coupled to the communication circuitry, e.g., via one or more buses. The processing circuitry may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry may be programmable hardware capable of executing software instructions stored, e.g., as a machine-readable computer program 133 in a memory circuitry 13. The memory circuitry of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination. According to particular embodiments in which the hardware is used to implement the UE 1, the memory circuitry may comprise a tamper resistant secure hardware component 8 providing secure storage, such as a 5G-USIM and/or UICC 8a.

The communication circuitry 12 may be a controller hub configured to control the input and output (I/O) data paths of the hardware. Such I/O data paths may include data paths for exchanging signals over a wireless communication network 30. For example, the communication circuitry may comprise a transceiver configured to send and receive communication signals within and/or between the UE 1, the serving network 2, and/or the home network 3, e.g., over an air, electrical, and/or optical medium.

The communication circuitry 12 may be implemented as a unitary physical component, or as a plurality of physical components that are contiguously or separately arranged, any of which may be communicatively coupled to any other, or may communicate with any other via the processing circuitry 11. For example, the communication circuitry may comprise transmitter circuitry configured to send communication signals, and receiver circuitry configured to receive communication signals (not shown).

According to particular embodiments, the hardware illustrated in FIG. 16 may be configured with a plurality of components. These components may include a plurality of communicatively coupled hardware units and/or software modules. One or more of the hardware units may be, e.g., part of the processing circuitry 11. One or more of the software units may be, e.g., stored in the memory circuitry 13 and executed by the processing circuitry.

Figure 17:
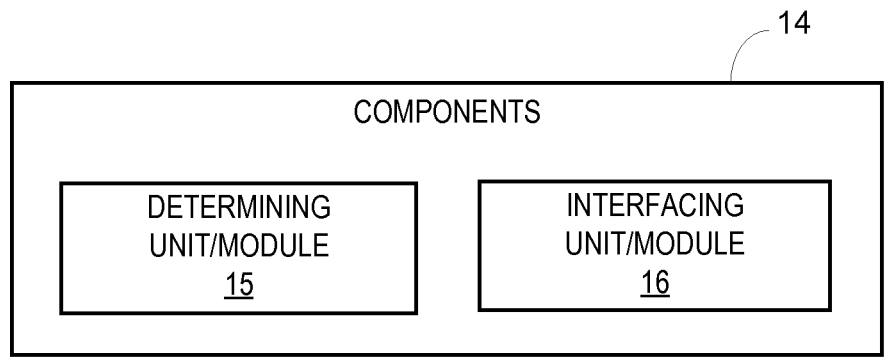
FIG. 17 illustrates an embodiment of an authentication server.

For example, hardware such as illustrated in FIG. 16 may be used to implement an authentication server 14 (e.g., an AMF, SEAF 4, AUSF 5) in a home network 3 of a UE 1 and configured with the example components illustrated in FIG. 17 to obtain a subscription identifier of a UE. The components of FIG. 17 include a determining unit or module 15 and an interfacing unit or module 16. The determining unit or module is configured to determine, based on information received from the UE, which of a plurality of de-concealing servers to use to decrypt at least part of a subscription concealed identifier (SUCI) in which the subscription identifier is encrypted. The interfacing unit or module is configured to send the SUCI to the determined de-concealing server and receiving the subscription identifier in response.

Figure 18:
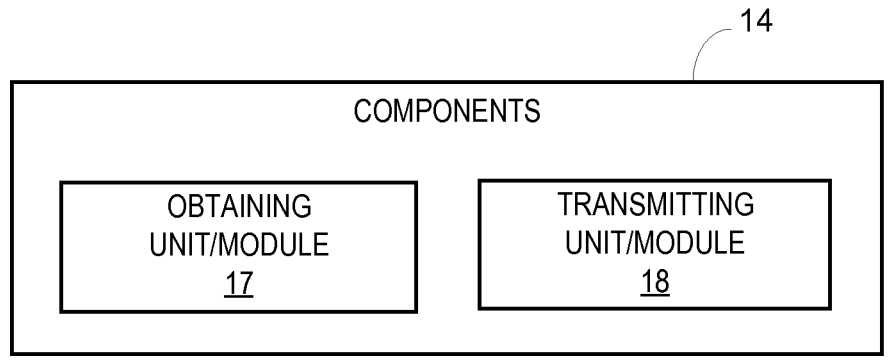
FIG. 18 illustrates an embodiment of an authentication server.

Such an authentication server 14 may additionally or alternatively be configured with the example components illustrated in FIG. 18 to provision a UE 1. The components of FIG. 18 include an obtaining unit or module 17, and a transmitting unit or module 18. The obtaining unit or module is configured to obtaining a message authentication code (MAC) based on a provisioning key specific to the UE 1 and a privacy key of a home network 3 of the UE. The transmitting unit or module is configured to transmit the privacy key and MAC to the UE.

Such an authentication server 14 may further be configured to additionally or alternatively perform any of the methods described herein with respect to an authentication server, e.g., using any of the above described authentication server hardware or software components.

Figure 19:
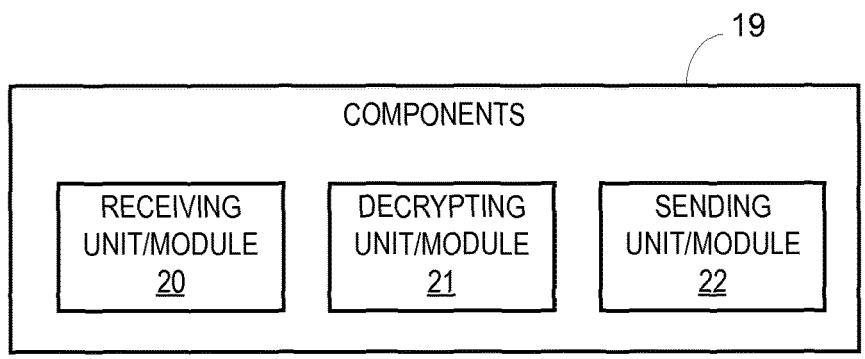
FIG. 19 illustrates an embodiment for e.g. a de-concealing server.

Other hardware consistent with the example illustrated in FIG. 16, may be used to implement a de-concealing server 19 (e.g., SIDF 6) for providing a subscription identifier of a UE 1 to an authentication server 14, and may be configured with the example components illustrated in FIG. 19. The components of FIG. 19 include a receiving unit or module 20, a decrypting unit or module 21, and a sending unit or module 22. The receiving unit or module is configured to receive, from the authentication server, a subscription concealed identifier (SUCI) in which the subscription identifier is encrypted. The decrypting unit or module is configured to decrypt at least part of the SUCI, using a decryption key identified from information received from the UE, to obtain the subscription identifier. The sending unit or module is configured to send the subscription identifier to the authentication server.

Figure 20:
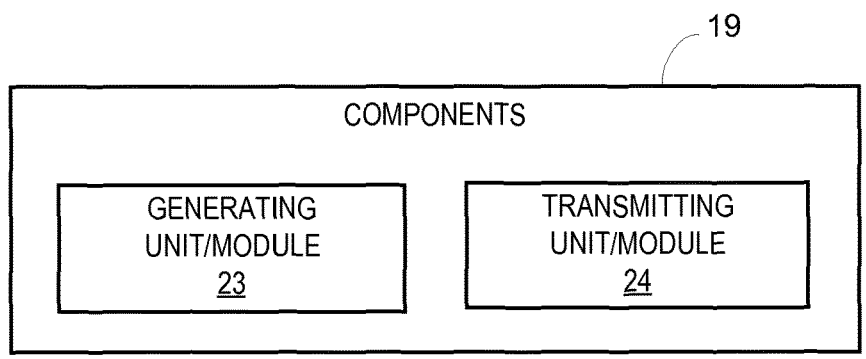
FIG. 20 illustrates an embodiment of a de-concealing server.

Such a de-concealing server 19 may additionally or alternatively be configured with the example components illustrated in FIG. 20 to provision a UE 1. The components of FIG. 20 include a generating unit or module 23, and a transmitting unit or module 24. The generating unit or module is configured to generate a Subscription Permanent Identifier (SUPI) and privacy key for the UE responsive to receiving, from an authentication server 14, a Subscription Concealed Identifier (SUCI) of the UE that indicates that the UE lacks a valid privacy key. The transmitting unit or module is configured to transmit the SUPI and privacy key to the authentication server. Thus the term 'de-concealing server' may also be termed a SUCI de-concealing server.

Such a de-concealing server 19 may further be configured to additionally or alternatively perform any of the methods described herein with respect to a de-concealing server, e.g., using any of the above described de-concealing server hardware or software components.

Figure 21:
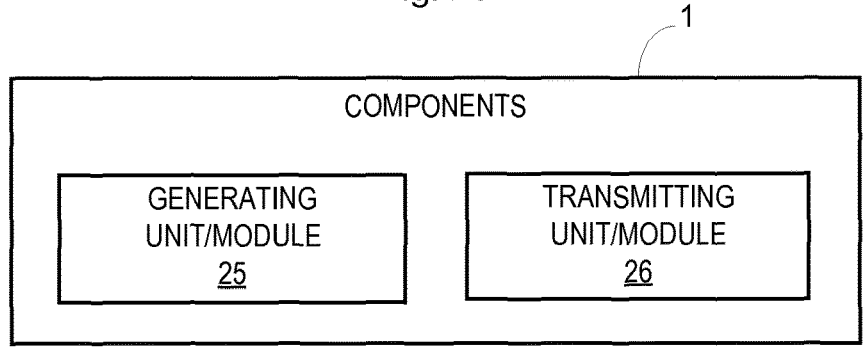
FIG. 21 illustrates an embodiment of a UE.

Yet other hardware consistent with the example illustrated in FIG. 16, may be used to implement a UE 1 for securely notifying a wireless communication network 30 of a subscription identifier, and may be configured with the example components illustrated in FIG. 21. The components of FIG. 21 include a generating unit or module 25, and a transmitting unit or module 26. The generating unit or module is configured to generate a subscription concealed identifier (SUCI) in which a subscription identifier of the UE is encrypted. The transmitting unit or module is configured to transmit, to an authentication server 14, the SUCI and information identifying a de-concealing server 19 capable of decrypting the subscription identifier.

Figure 22:
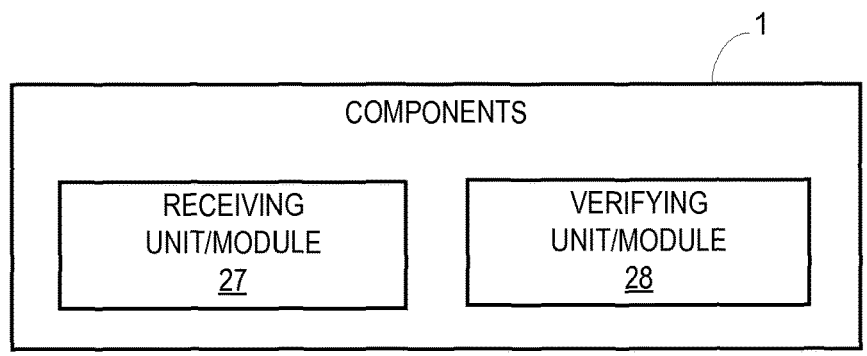
FIG. 22 illustrates an embodiment of a UE.

Such a UE 1 may additionally or alternatively be configured with the example components illustrated in FIG. 22 to obtain a privacy key. The components of FIG. 22 include a receiving unit or module 27, and a verifying unit or module 28. The receiving unit or module is configured to receiving the privacy key and a message authentication code (MAC) from an authentication server 14. The verifying unit or module is configured to verify the integrity of the privacy key by generating a provisioning key and using the provisioning key and privacy key to reproduce the MAC received from the authentication server, the provisioning key being a shared secret between the UE and the authentication server.

Such a UE 1 may further be configured to additionally or alternatively perform any of the methods described herein with respect to a UE, e.g., using any of the above-described UE hardware or software components.

The various methods and processes described herein may be implemented in ways that vary in certain details from the broad descriptions given above. For example, although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. The embodiments described herein are to be considered in all respects as illustrative and not restrictive. In particular, all changes coming within the meaning and equivalency range of the enumerated embodiments appended below are intended to be embraced therein.

The invention claimed is:

1. A method performed by a de-concealing server for provisioning a user equipment (UE), the method comprising:
   generating a Subscription Permanent Identifier (SUPI) and a privacy key for the UE, wherein the privacy key comprises a public key of a home network of the UE, responsive to receiving, from an authentication server, a Subscription Concealed Identifier (SUCI) of the UE that indicates that the UE lacks a valid privacy key;
   generating a message authentication code (MAC) based on the privacy key and a provisioning key which is specific to the UE and is a shared secret between the de-concealing server and the UE,
   transmitting the SUPI, the MAC and the privacy key to the authentication server.

2. The method of claim 1, further comprising detecting that the SUCI indicates that the UE lacks a valid privacy key by detecting that at least part of the SUCI is encrypted using an obsolete privacy key.

3. The method of claim 2, wherein the obsolete privacy key is an expired or compromised privacy key.

4. The method of claim 1, wherein generating the privacy key comprises generating the privacy key in accordance with an encryption scheme policy governing secure communication of a subscriber identifier of the UE in a wireless communication network.

5. The method of claim 4, wherein generating the privacy key in accordance with the encryption scheme policy comprises generating the privacy key such that the privacy key is adapted for generating a new SUCI in which the subscriber identifier of the UE is encrypted according to an Elliptic Curve Integrated Encryption scheme.

6. The method of claim 1, further comprising generating at least one additional privacy key responsive to receiving the SUCI, and transmitting the at least one additional privacy key to the authentication server.

7. The method of claim 1, further comprising transmitting the provisioning key to the authentication server.

8. The method of claim 1, wherein the privacy key further comprises an identifier that identifies in which of plurality of encryption schemes the public key is used.

9. The method of claim 8, wherein the privacy key further comprises a parameter used in the encryption scheme in which the public key is used.

10. The method of claim 1, wherein the privacy key comprises a subscription identifier, e.g. a Mobile Subscription Identification Number, of the UE.

11. The method of claim 1, wherein the privacy key comprises an identifier of the home network.

12. The method of claim 1, wherein the privacy key comprises validity time information indicating a time in which the privacy key is valid.

13. The method of claim 1, wherein the privacy key comprises a digital signature calculated over one or more parts of the privacy key.

14. The method of claim 1, wherein the privacy key comprises a field explicitly indicating a procedure in which the privacy key may be used.

15. A de-concealing server, for provisioning a user equipment (UE), the de-concealing server comprising:
   a processing circuitry and a memory circuitry, the memory circuitry containing instructions executable by the processing circuitry whereby the de-concealing server is operative to:
   responsive to receiving, from an authentication server, a Subscription Concealed Identifier (SUCI) of the UE that indicates that the UE lacks a valid privacy key, generate a Subscription Permanent Identifier (SUPI) and a privacy key for the UE, wherein the privacy key comprises a public key of a home network of the UE;
   generating a message authentication code (MAC) based on the privacy key and a provisioning key which is specific to the UE and is a shared secret between the de-concealing server and the UE; and
   transmitting the SUPI, the MAC and the privacy key to the authentication server.

16. The de-concealing server of claim 15, comprising at least one Subscription Identifier De-concealing Function and a Unified Data Management.

17. The de-concealing server of claim 15, wherein the de-concealing server is operative to detect that the SUCI indicates that the UE lacks a valid privacy key by detecting that at least part of the SUCI is encrypted using an obsolete privacy key.

18. The de-concealing server of claim 17, wherein the obsolete privacy key is an expired or compromised privacy key.

19. The de-concealing server of claim 15, wherein being operative to generate the privacy key comprises generating the privacy key in accordance with an encryption scheme policy governing secure communication of a subscriber identifier of the UE in a wireless communication network.

20. A memory circuitry comprising a computer program which comprises instructions which, when executed on at least one processing circuitry of a de-concealing server, cause the de-concealing server to:
   generate a Subscription Permanent Identifier, SUPI, and a privacy key for the UE, wherein the privacy key comprises a public key of a home network of the UE, responsive to receiving, from an authentication server, a Subscription Concealed Identifier, SUCI, of the UE that indicates that the UE lacks a valid privacy key;
   generate a message authentication code, MAC, based on the privacy key and a provisioning key which is specific to the UE and is a shared secret between the de-concealing server and the UE; and
   transmit the SUPI, the MAC and the privacy key to the authentication server.

* * * * *